(12) United States Patent
Clark et al.

(10) Patent No.: US 7,908,082 B2
(45) Date of Patent: Mar. 15, 2011

(54) METHODS AND SYSTEMS FOR DISPLAYING AIRPORT MOVING MAP INFORMATION

(75) Inventors: Samuel T. Clark, Federal Way, WA (US); William L. Goodman, Coupeville, WA (US); Roglenda R. Bowe, Maple Valley, WA (US); Michael P. Snow, Langley, WA (US)

(73) Assignee: The Boeing Company, Chicago, IL (US)

( * ) Notice: Subject to any disclaimer, the term of this patent is extended or adjusted under 35 U.S.C. 154(b) by 724 days.

(21) Appl. No.: 11/744,671

(22) Filed: May 4, 2007

(65) Prior Publication Data

US 2008/0275642 A1 Nov. 6, 2008

(51) Int. Cl.
*G01C 21/00* (2006.01)

(52) U.S. Cl. ........ 701/211; 701/225; 340/961; 345/440; 341/139

(58) Field of Classification Search .................. 701/211, 701/14–16, 225; 340/971, 969, 961; 342/179; 725/76, 77; 345/440; 341/118, 139; *G01C 21/00*
See application file for complete search history.

(56) References Cited

U.S. PATENT DOCUMENTS

| | | | | |
|---|---|---|---|---|
| 4,812,945 A * | 3/1989 | D'Onofrio | | 361/154 |
| 5,047,775 A * | 9/1991 | Alitz | | 342/26 D |
| 5,047,793 A * | 9/1991 | Shiomi | | 396/89 |
| 5,170,166 A * | 12/1992 | Tanaka et al. | | 341/139 |
| 5,319,305 A * | 6/1994 | Baba | | 324/115 |
| 5,638,076 A * | 6/1997 | Gravelle et al. | | 342/94 |
| 5,684,696 A * | 11/1997 | Rao et al. | | 701/25 |
| 5,838,562 A * | 11/1998 | Gudat et al. | | 701/213 |
| 6,380,726 B1 * | 4/2002 | Szabo | | 324/115 |
| 6,694,249 B1 | 2/2004 | Anderson et al. | | |
| 6,957,130 B1 | 10/2005 | Horvath et al. | | |
| 6,993,291 B2 * | 1/2006 | Parssinen et al. | | 455/67.11 |
| 7,194,342 B1 | 3/2007 | Horvath et al. | | |
| 7,382,285 B2 * | 6/2008 | Horvath et al. | | 340/961 |
| 7,382,288 B1 * | 6/2008 | Wilson et al. | | 340/972 |
| 7,555,372 B2 * | 6/2009 | Dwyer | | 701/16 |
| 7,567,187 B2 * | 7/2009 | Ramaiah et al. | | 340/945 |

(Continued)

FOREIGN PATENT DOCUMENTS

JP 61138170 A * 6/1986
JP 2006300027 A * 11/2006

*Primary Examiner* — Tuan C To
(74) *Attorney, Agent, or Firm* — Armstrong Teasdale LLP

(57) ABSTRACT

Methods and systems for presenting a current position of a vehicle on a moving map display are provided. The method includes determining a current position and a path of travel of the vehicle, determining a current position of at least one of a second vehicle, an object, and an area of interest wherein determining a current position of the second vehicle includes determining a path of travel of the second vehicle, and displaying a depiction of the vehicle and at least a portion of the at least one of the second vehicle, the object, and the area of interest at a first range setting. The method further includes automatically changing from the first range setting to a second range setting based on at least one of an approach autorange activation, an offscale traffic activation, and an offscale object or area of interest autorange activation, and displaying the ownship depiction and at least a portion of the at least one of the second vehicle, the object, and the area of interest at the second range setting.

21 Claims, 13 Drawing Sheets

U.S. PATENT DOCUMENTS

| | | | |
|---|---|---|---|
| 7,587,733 B2 * | 9/2009 | Keen et al. | 725/76 |
| 7,696,904 B2 * | 4/2010 | Horvath et al. | 340/961 |
| 2002/0008640 A1 * | 1/2002 | Horvath et al. | 340/945 |
| 2002/0128755 A1 * | 9/2002 | Horvath et al. | 701/3 |
| 2003/0009278 A1 | 1/2003 | Mallet et al. | |
| 2007/0080848 A1 | 4/2007 | Stone et al. | |

* cited by examiner

US 7,908,082 B2

METHODS AND SYSTEMS FOR DISPLAYING AIRPORT MOVING MAP INFORMATION

BACKGROUND

This disclosure relates generally to aircraft cockpit displays and more particularly, to methods and systems for displaying moving maps and related information on aircraft cockpit displays.

At least some known aircraft include cockpit displays that are controlled by an information system. Cockpit displays include the basic displays that are supplied with the aircraft, and other add-on displays which vary in their degree of integration with the physical aircraft structure and aircraft systems.

To promote safety and efficiency, electronic moving maps in general, and an electronic airport moving map (EAMM) in particular, may be provided on cockpit displays. The EAMM provides a map of the airport surface with an ownship position depiction, and may include cleared taxi route, normal operational information, for example, ATIS/NOTAM information, runway status, runway exit info, traffic, alerting, and other features. On approach and during landing/rollout, the EAMM may provide runway related information such as runway status and related traffic, traffic conflicts, braking, and runway exit information. However, manual crew display range control to view/display approach runway and related operational information distracts from the primary crew responsibilities of flying the aircraft, navigation, and communication, and introduces new and undesirable crew workload. In addition, the discrete/fixed display range selections currently typically provided do not allow optimum display of approach runway and other important/useful display information.

Current implementations of navigation display and EAMM display range selection are typically in whole number increments for example, 640, 320, 160, 80, 40, 20, 10, 5, 2, 1, and 0.5 nautical mile ranges such that intermediate display range selections between the whole number increments are not utilized. Further, the manual setting of the display range may preclude display of traffic, areas or other objects of interest, or other information beyond the display range of the EAMM 114 that may be important to safety and/or situational awareness.

Methods and systems are needed for cockpit situational awareness displays that provide an optimum view of the area surrounding the vehicle and that facilitate reducing display management user workload.

SUMMARY

In one embodiment, a method of indicating a position of a vehicle on a display system includes determining a current position and a path of travel of the vehicle, determining a current position of at least one of a second vehicle, an object, and an area of interest wherein determining a current position of the second vehicle includes determining a path of travel of the second vehicle, and displaying a depiction of the vehicle and at least a portion of the at least one of the second vehicle, the object, and the area of interest at a first range setting. The method further includes automatically changing from the first range setting to a second range setting based on at least one of an approach autorange activation, a taxi autorange activation, and an offscale traffic activation, and displaying the ownship depiction and at least a portion of the at least one of the second vehicle, the object, and the area of interest at the second range setting.

In another embodiment, a method of presenting a current position of a vehicle on a moving map display using automatic display ranging includes determining a current position or orientation of the vehicle with respect to at least one of a predetermined object and an area of interest and displaying an ownship depiction of the vehicle and at least a portion of the at least one of a predetermined object and an area of interest at a first range setting. The method also includes automatically changing from the first range setting to a second range setting based on a first triggering event wherein the first triggering event includes at least one of a proximity or orientation of the vehicle to the predetermined object and a proximity or orientation of the vehicle to the area of interest and displaying the ownship depiction and at least a portion of the at least one of the predetermined object and the area of interest at the second range setting.

In yet another embodiment, a cockpit display system including a moving map display includes an automatic display range control module configured to receive airport map data information from an airport map database, traffic data information, pilot inputs, and ownship data information from respective vehicle subsystems. The cockpit display system also includes a traffic data module configured to determine at least one other vehicle type, identification, position, speed, thrust, air/ground state, and movement and a position of stationary objects proximate one or more areas of interest for display on the moving map display, and an ownship data module configured to determine the type, identification, position, heading, speed, thrust, air/ground state, and taxi route of ownship.

DETAILED DESCRIPTION

Figure 1:
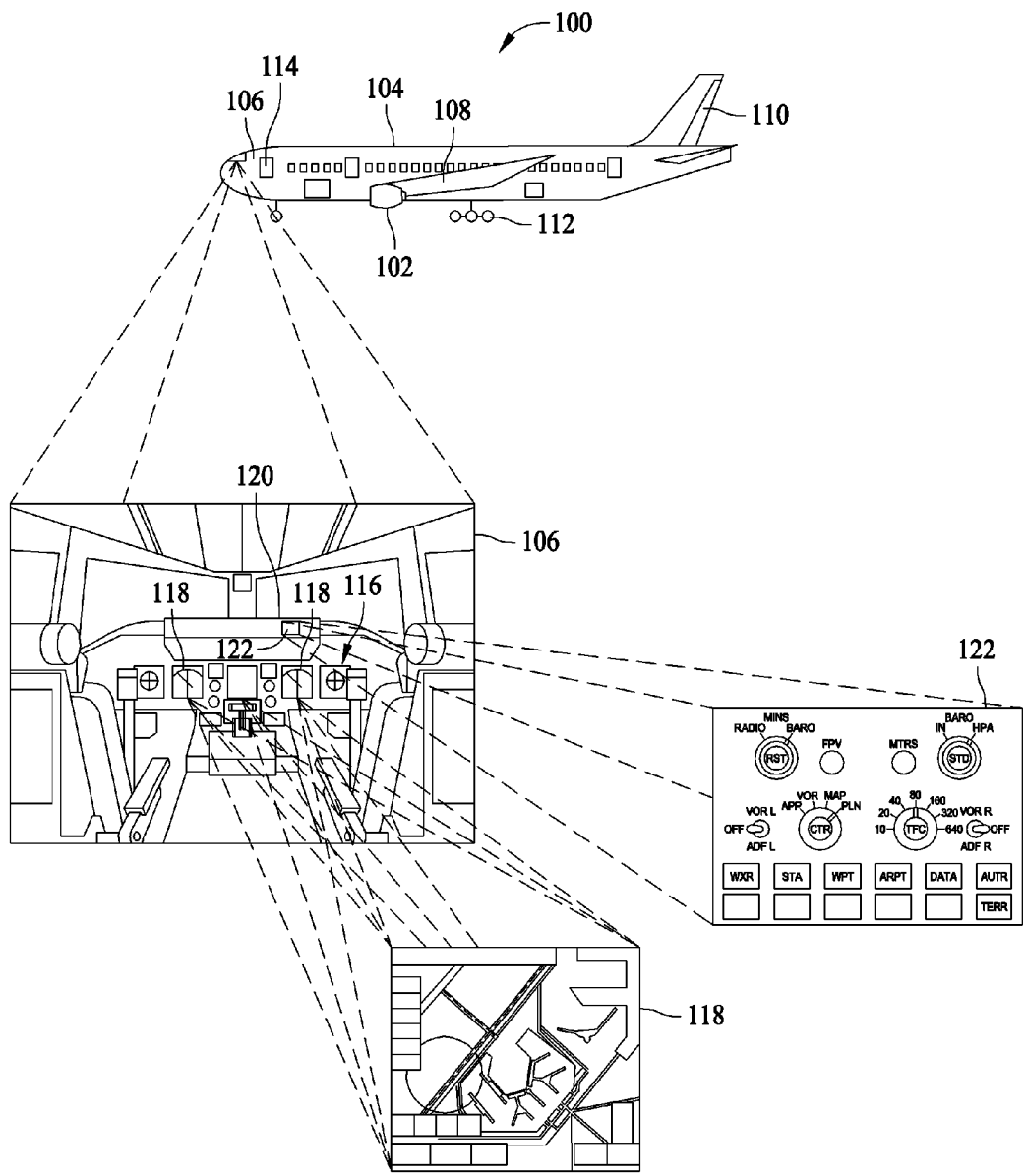
FIG. 1 is a side elevational view of a vehicle such as an aircraft in accordance with an embodiment of the present disclosure.

FIG. 1 is a side elevational view of a vehicle 100 such as an aircraft in accordance with an embodiment of the present disclosure. Aircraft 100 includes one or more propulsion engines 102 coupled to a fuselage 104, a cockpit 106 in fuselage 104, wing assemblies 108, a tail assembly 110, a landing assembly 112, a control system (not visible), and a plurality of other systems and subsystems that enable proper operation of vehicle 100. At least one component of an electronic airport moving map system (EAMM) 114, formed in accordance with the present disclosure, is located within fuselage 104. However, components of EAMM system 114 may be distributed throughout the various portions of vehicle 100 and other components may also be located off board vehicle 100 and in communication with the onboard components.

Although vehicle 100 shown in FIG. 1 is generally representative of a commercial passenger aircraft, including, for example, the 737, 747, 757, 767, 777, and 787 models commercially-available from The Boeing Company of Chicago, Ill., the inventive apparatus and methods disclosed herein may also be employed in virtually any other types of aircraft or other vehicle. More specifically, embodiments of the present disclosure may be applied to other passenger aircraft, cargo aircraft, rotary aircraft, and any other types of aircraft. It may also be appreciated that alternate embodiments of the system and methods in accordance with the present disclosure may be utilized in a wide variety of vehicles, including, ships, trains, and any other suitable vehicle. It may also be appreciated that alternative embodiments of the system and methods in accordance with the present disclosure may be utilized in a wide variety of fixed base and/or non-moving applications such as air traffic control towers, and radar control and monitoring stations.

Cockpit 106 includes an aircraft cockpit display panel 116 that includes at least one display screen 118 in accordance with an embodiment of the present disclosure. In the exemplary embodiment, display screen 118 is positioned on aircraft cockpit forward display panel 116. In an alternative embodiment, display screen 118 is positioned on an auxiliary side panel (not shown) located in the cockpit of the aircraft. During aircraft operation, display screen 118 is available for viewing by a pilot and/or co-pilot of the aircraft. Display screen 118 may be used to view data included in an electronic flight bag (not shown), which may be embodied as a standalone device such as, but not limited to a PDA or laptop PC, or as a software component of a system executing on a processor that is part of a subsystem of the aircraft. For example, airport moving map displays are provided by the Electronic Flight Bag (EFB) on aircraft such as the Boeing 777, and are integral with the navigation displays planned for the Boeing 787. In the exemplary embodiment, the electronic flight bag or navigation displays includes an electronic storage device configured to store various user-configurable flight-related objects for all required and desired information to display an aircraft's own position, runway status as well as pilot awareness of related traffic information relevant to the movement of ownship aircraft. Data is received from various aircraft and ground sensors and systems, runway, approach, and departure information based on the received data is determined in real-time, and the runway, approach, and departure information and/or alerts are displayed to the flight crew through display screen 118 and other cockpit 106 aurals and/or visual indicators. Such runway, approach, and departure information provides the flight crew with additional situational awareness during aircraft operation. Cockpit displays include the basic displays that are supplied with the aircraft, and other add-on displays which vary in their degree of integration with the physical aircraft structure and aircraft systems.

Cockpit 106 also includes a glare shield 120 that includes at least one EFIS control panel 122 that is used to control a respective Primary Flight Display (PFD) and/or Navigation Display (ND). EFIS control panel 122 includes controls for selecting autorange, various ND modes and ranges as well as switches which control the display of traffic and other information.

Figure 2:
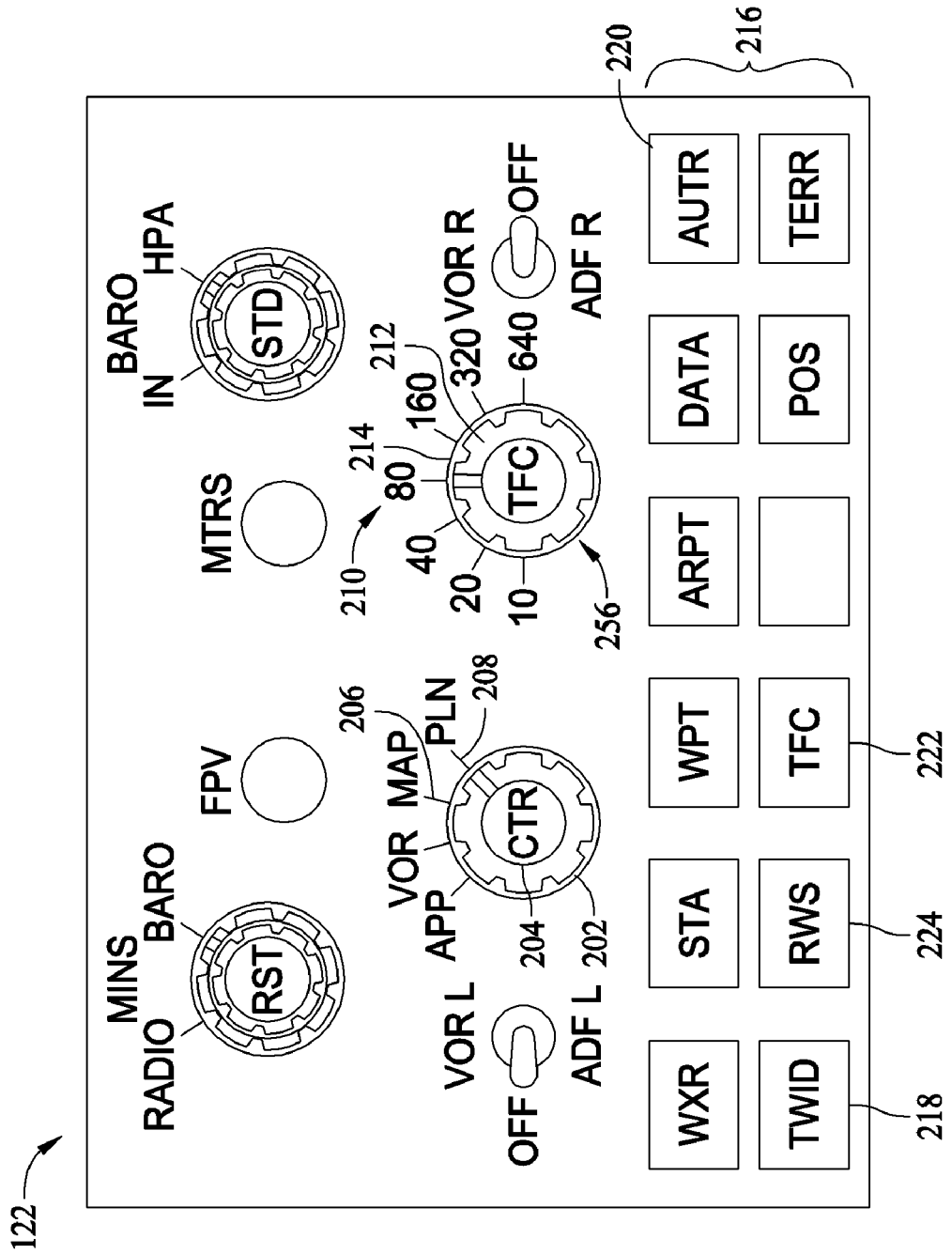
FIG. 2 is a front perspective view of an exemplary Electronic Flight Information System (EFIS) control panel that may be used with electronic airport moving map system (EAMM) 114 shown in FIG. 1.

FIG. 2 is a front perspective view of an exemplary EFIS control panel 122 that may be used with electronic airport moving map system (EAMM) 114 (shown in FIG. 1). EFIS control panel 122 includes an ND Mode Selector 202 for selecting a track up or a north up map display orientation and a CTR Switch 204 for selecting centered or expanded mode map display. CTR Switch (inner) 204 when pushed, centers the display on ownship and displays full compass rose. Subsequent pushes alternate between expanded and centered displays. ND Mode Selector (outer) 202 includes a MAP position 206 for selecting track up map orientation, and a PLN position 208 for selecting North up map orientation. MAP position 206 provides FMC-generated route and map information, airplane position, heading and track displayed in track-up format. PLN position 208 provides a stationary true north-up depiction. In all modes, the airplane symbol represents the actual ownship position.

EFIS control panel 122 further includes an ND Range Selector and TFC Switch 210 that includes a TFC Switch (inner) 212 that when pushed, displays traffic information on the ND and a ND Range Selector (outer) 214 that is used to manually select the desired ND nautical mile range scale.

A plurality of MAP switches 216 select or remove detailed ND information. More than one MAP switches 216 may be selected at a time. In the exemplary embodiment, a TWID switch 218 is a three state pushbutton switch that is selectable to cycle through positions that display all, some, and no taxiway identifiers in turn. Taxiway identifiers are used to display a determined status of each taxiway and/or a taxiway nomenclature that uniquely identifies the taxiway. As TWID switch 218 is depressed more or less information is displayed to the flight deck crew. When 'all' taxiway identifiers is selected, all identifiers on the taxiways will be displayed. When 'some' taxiway identifiers is selected only those identifiers for the currently displayed taxi route and/or those identifiers determined to be relevant to ownship position, orientation, or operations are displayed. When 'no' taxiway identifiers is selected, taxiway identifiers indication is turned off.

An ARNG switch 220 toggles between auto-range on (enabled) and off (disabled). ARNG switch 220 enables automatic range display and permits activation of approach autoranging logic, traffic autoranging logic, and other (area or object) autoranging logic. The autoranging logic specifies threats and conflicts or potential threats and conflicts between ownship and other vehicles, objects, and/or areas of interest, and is used to determine the optimal range for display of operationally useful information such as threats, conflicts, other vehicles, objects, and/or areas of interest. For example, during approach and landing, autoranging to maintain the approach runway and obstacles proximate the airport, as well as traffic in the air and proximate the runway displayed for the flight crew at the optimal range setting facilitates improving situational awareness while reducing flight crew workload.

While taxiing, autoranging logic monitors and displays other taxiing traffic, take-off, and landing traffic to determine threats and conflicts or potential threats and conflicts between ownship and the traffic to facilitate situational awareness and safety on the ground. When ARNG switch 220 is selected off (disabled), the cockpit display uses (reverts to) the manually selected range for display. Moreover, when autorange logic deactivates, the cockpit display will also use (revert to) the manually selected range for display. During operation, when there are no offscale threats and conflicts or potential threats and conflicts between ownship and the traffic, or no operationally important offscale information, the autorange logic will deactivate and return the display autorange setting to the manually selected display range setting. In an alternative embodiment, ARNG switch 220 toggles between auto-range on (enabled), Reset (returned to manually selected display range but reenabled for a new condition) and off (disabled). Once autorange activated, selecting the switch would reset (deactivate) autorange and enable it for activation/operation once new logical conditions for autorange activation were satisfied. With autorange on or activated, selecting the switch twice within some specified period of time (e.g., <1 or 2 seconds) would turn autorange off (disable autorange until manually reselected on).

In an alternative embodiment, TFC switch 212 may be embodied in a three state pushbutton switch 222 that is selectable to cycle through positions that display all, some, and no traffic depictions in turn. Traffic depictions are used to display traffic that is taxiing, approaching a runway, positioning for takeoff and taking off. As TFC switch 222 or 212 is depressed, more or less information is displayed to the flight deck crew. As TFC switch 222 or 212 is depressed more or less information is displayed to the flight deck crew. When 'all' traffic is selected, all traffic will be displayed. When 'some' traffic is selected only that traffic that is determined to be relevant to ownship operation (e.g., related to current ownship position and orientation and/or associated with certain selected runways and/or taxiways and/or a potential or actual conflict with ownship) is displayed. Other traffic may also be displayed based on predetermined logic and/or selectable parameters. When 'no' traffic is selected, all traffic indication is turned off with the possible exception of traffic that is in actual or impending conflict with ownship. Traffic that is offscale and is determined to be a threat or conflict or potential threat or conflict with ownship activates autorange and is displayed. An RWS switch 224 toggles between a runway status on and a runway status off position.

The switches described above facilitate autoranging the display such that the ownship, objects and areas of interest, and other traffic are displayed at the lowest range or highest range setting possible while keeping the above items on the display. Different autorange applications may each comprise different purposes and logic. For example; an approach autorange is a display of an offscale object or area of interest and tends to optimize the display of approach runway or runway exit and an offscale traffic autorange tends to optimize display of offscale traffic. Because in certain instances, approach autorange and offscale traffic autorange may tend to generate ranges that are incompatible with each other, arbiter software prioritizes which autorange approach prevails. For example, during an approach to a runway, approach autorange may be tending to reduce the display range setting to improve the range setting of the approaching runway. However, another vehicle may activate offscale traffic autorange to increase the display range such that the offscale traffic will be viewable on the display. The arbiter software determines which situation has priority to control the autorange range setting. Such arbitration occurs in real-time along with the autorange range setting determination.

Approach autorange optimizes the display of approach runway, approach runway exit, or other airport feature on approach and is a display of an offscale object or area of interest. Approach autorange logic activates autorange, overrides the manually selected display range, and automatically ranges in or out to optimize the display of the approach runway, the approach runway exit, or some other predetermined airport feature. Display information is optimized when shown at the lowest possible scale range setting. In one embodiment, approach autorange does not override a manual range setting larger than the autorange range setting. Autorange activates and transitions from some first range setting to a second, third, or subsequent range setting quickly but perceptibly in very small increments so as to appear smooth and continuous. Such continuous transitions provide a visual cue that differentiates autorange transitions from manual range transitions, which appear to 'jump' or change instantly. Once approach autorange initially ranges out or in to the second range setting, it then ranges in to subsequent range settings to optimize display information until autorange deactivates or is selected off. The initial autorange range transition out or in may be to some second range setting of varying numerical significance such as 0.0, 0.1, 0.11, 0.25, 0.5), or may be to one of a specific set of predetermined ranges or range settings such as 10, 5, 4, 3, 2, 1, and 0.5 nm). Subsequent autorange in may be in very small increments such as 0.01 nm so as to appear continuous, or may be in larger ranges/range settings or 'steps' that may correspond to the EFIS range selections of 10, 5, 4, 3, 2, 1, and 0.5 nm so as to appear to quickly and smoothly transition from range setting to range setting and pause at each range setting until the display information is optimized at the next range setting.

In alternative embodiments, the range settings or ranges autorange may display, the increments in which it transitions between range settings/ranges, and the speed with which autorange transitions between range settings occur, may all vary significantly—alone and in combination.

Offscale traffic autorange optimizes the display of offscale traffic. Offscale traffic autorange, when activated, overrides the manually selected display range and automatically ranges out to display the offscale traffic. In one embodiment, offscale traffic autorange activates and transitions from a first range setting to a second, third, or subsequent range setting quickly but perceptibly in very small increments so as to appear smooth and continuous. Such continuous transitions provide a visual cue that differentiates autorange transitions from manual range transitions, which appear to 'jump' or change instantly. After offscale traffic autorange initially ranges out to the second range setting, it then ranges in until offscale traffic autorange deactivates, is selected off, or a larger/higher range is selected. The initial offscale traffic autorange out may be to some second range setting of varying numerical significance such as 0.0, 0.1, 0.11, 0.25, 0.5), or may be to one of a specific set of predetermined range selections such as 10, 5, 4, 3, 2, 1, and 0.5 nm). Subsequent autorange in may be in very small increments such as 0.01 nm so as to appear continuous, or may be in larger ranges/range settings or 'steps' that may correspond to EFIS range selections of 10, 5, 4, 3, 2, 1, and 0.5 nm so as to appear to quickly and smoothly transition from range setting to range setting and pause at each range setting until the display information is optimized at the next range setting. In the exemplary embodiment, offscale traffic autorange seeks to return the autorange display range setting to the manually selected display range.

Traffic autorange may also be used to optimize the display of onscale traffic. In this embodiment, autorange ranges to the lowest possible range/resolution displaying the trigger traffic whether the trigger traffic is onscale or offscale. Consequently, traffic autorange may range out to display offscale traffic, or range in to optimize the display of important onscale traffic. When autorange activates for an onscale item of interest which is moving offscale, autorange automatically ranges out continuously or in steps to keep the item of interest onscale and in view on the display. In this embodiment, autorange also seeks to return to the manually selected display range.

Figure 3:
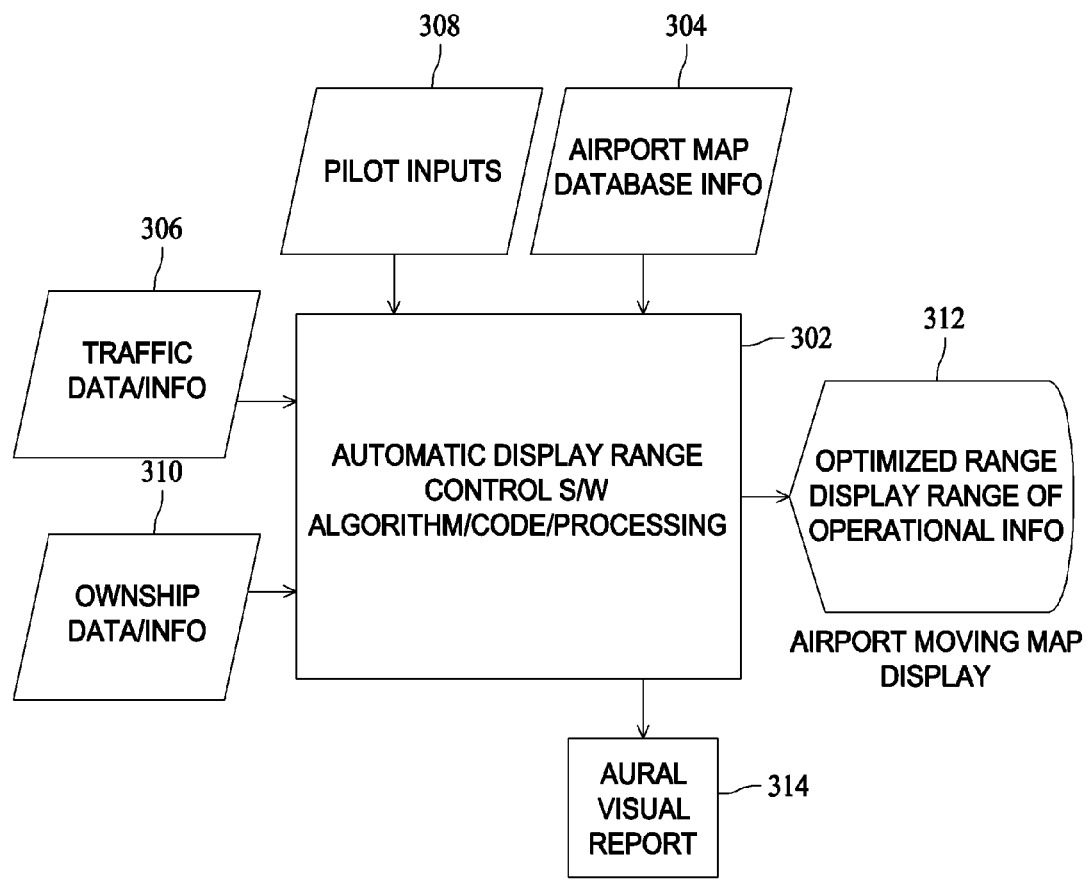
FIG. 3 is a schematic data flow diagram of electronic airport moving map system (EAMM) 114, for a vehicle in accordance with an embodiment of the disclosure.

FIG. 3 is a schematic data flow diagram of electronic airport moving map system (EAMM) 114, for a vehicle in accordance with an embodiment of the disclosure. In this embodiment, an automatic display range control module 302 of system 114 receives airport map data information 304, traffic data/information 306, pilot inputs 308, and ownship data/information 310 from respective modules and/or vehicle subsystems. Automatic display range control module 302 then processes the collective data to define an optimized range for a graphic display that includes a volume about one or more areas or items of interest, for example, but not limited to an airport. Automatic display range control module 302 also monitors other vehicle positions and movements as well as the position of stationary objects proximate the area of interest for display on an airport moving map 312. In a further embodiment, an audio-visual report system 314 may also be provided. Audio-visual report system 314 may present aural reports of actual or potential threats or conflicts to ownship air or ground space, by representative tones or human speech. The tones and human speech may further provide information regarding the type of traffic vehicles and the nature of the threat or conflict associated with each report.

In the exemplary embodiment, traffic data/information 306 and ownship data/information 310 may be obtained, for example, from automatic dependent surveillance broadcast (ADS-B) traffic information, air traffic control (ATC) radar traffic information, ground vehicle traffic information, and aircraft system and aircraft database information.

Traffic data/information 306 includes data regarding the type, identification, position, speed, thrust, and taxi route of one or more vehicles, as well as data as to whether each vehicle is on the ground or airborne. In particular, due to the large dimensions of some traffic vehicles, e.g., commercial passenger aircraft, the position of each traffic vehicle may be further defined as the operator eye reference point (ERP) in each vehicle. In other words, the position of a traffic vehicle may be further pinpointed as the position within the vehicle occupied by the operator. In alternative embodiments, the position of a traffic vehicle may also be further defined as the vehicle's center of gravity (CG). For example, for a traffic vehicle that is an aircraft, the position of a traffic vehicle may be further pinpointed to the approximate longitudinal and bilateral center of the aircraft's fuselage or wing. Nevertheless, it will be appreciated that the position of a traffic vehicle may also be defined in alternative ways, such as by an imaginary envelope encompassing the most distal point or points of the traffic vehicle.

Ownship data/information 310 includes data regarding the type, identification, position, heading, speed, thrust, taxi route, as well as data as to whether the aircraft is on ground or airborne. Again, the position of ownship, or an aircraft equipped with EAMM 114, may be defined as the operator (pilot) eye reference point (ERP), as well as the aircraft's center of gravity (CG) or other suitable alternatives, such as by an imaginary envelope encompassing the most distal point or points of the aircraft. Furthermore, (EAMM) 114 may use determinations of runway status to determine autorange activation and range selection. Runway status may determine whether a runway is one of Unoccupied, Occupied, In-Use (meaning use by an ownship may be limited), Not-in-Use (meaning available for use by an ownship), or Restricted (meaning not available for use by an ownship). With respect to runway status indicators, "use by an ownship" refers to such operations as runway crossing, runway taxi, takeoff or approach and landing.

In general, automatic display range control module 302 determines runway status for each runway based on one or more traffic vehicle positions, ownship position, and a monitored volume defined around each area of interest runway or other vehicle path. Information for defining a monitored volume with respect to each runway may be supplied by Airport Map Database 304. In one embodiment, the three dimensional monitored volume is established with respect to the length of the runway, the width of the runway, and a predetermined height above the runway. In a further embodiment, the monitored volume dimensions extend a predetermined distance to the left and right of runway centerline, extend a predetermined distance beyond each runway threshold, and extend to a predetermined height above ground level. In an additional embodiment, the dimensions and the shape of the monitored volume may be varied as a function of estimated, calculated or required time of traffic or ownship arrival to the runway corresponding to the monitored volume. Nevertheless, it will be appreciated that the dimensions and the shape of the monitored volume may also be varied to support effective implementation, such as to accommodate operational needs, unusual or non-linear airport runway, taxiway, approach and departure path configurations, as well as for other applications such as traffic display/filtering and traffic conflict alerting.

Moreover, a plurality of logic algorithms and parameters may be used to determine runway status, automatic range selection, and off scale range selection. Runway status may be a necessary, but not always sufficient component, for off-scale traffic autorange and other functions, for example, for an automatic range selection or a traffic conflict alert. In addition, runway status may be used to support autorange or traffic conflict alerting but not displayed. For example, an occupied runway may be an area of interest for automatic range selection. If the runway meets the criteria for an occupied status, a vehicle may be in a position to present an actual or potential threat or conflict with ownship.

The runway status for a particular runway is defined as "Occupied" when at least one traffic vehicle is in the runway's corresponding monitored volume and the traffic vehicle's speed is less than or equal to a maximum threshold. In one embodiment, the maximum threshold is less than or equal to 50 knots. However, to activate autorange, the other vehicle must be offscale (beyond the current selected display range) and in a position to conflict or potentially conflict with ownship path. In another embodiment, a runway is determined to be "Occupied" when it intersects "ownship runway" and the ground speed of at least one traffic vehicle present in the runway's monitored volume is greater than zero, but is less than or equal to a maximum threshold. Again, to activate autorange, the other vehicle must be offscale (beyond the current selected display range) and in a position to conflict or potentially conflict with ownship path. For this purpose, a runway is an "ownship runway" when ownship is in a monitored volume corresponding to the runway, and ownship heading is aligned within a predetermined angle of the runway heading. However, it will be appreciated that "ownship runway" may also be any runway that the ownship is using for taxi, takeoff, or landing.

The runway status for a particular runway is defined as "In-use" when the positions of one or more traffic vehicles, regardless of ground or airborne status, are in the corresponding monitored volume of the runway and the speed of at least one traffic vehicle is greater than a minimum threshold. In one embodiment, the minimum threshold is greater than 50 knots. Nevertheless, to activate autorange, the other vehicle must be offscale (beyond the current selected display range) and in a position to conflict or potentially conflict with ownship path. Conflict or potential conflicts occur when positions of ownship and at least one traffic vehicle, headings of ownship and at least one traffic vehicle, tracks of ownship and at least one traffic vehicle, and/or travel of ownship and at least one traffic vehicle indicate that the at least one traffic vehicle and ownship intersect, potentially intersect, or otherwise conflict or may conflict with each other in a hazardous manner.

A runway is generally determined to be "Not-In-Use" when the positions, headings, tracks, or travel of ownship and all traffic vehicles are such that they do not or cannot potentially intersect or otherwise conflict with each other in a hazardous manner. In a particular embodiment, combinations of one or more additional factors, such as the ground speed of ownship and one or more traffic vehicles, the airspeed of ownship and one or more traffic vehicles, the altitude of ownship and one or more traffic vehicles, the distances between ownship and one or more traffic vehicles, the thrust setting of ownship and one or more traffic vehicles, as well as variation in these factors, may be used to determine whether a runway is "Not-In-Use". In other embodiments, these factors may be further combined with other relevant information, such as the power mode (e.g., on/standby) of the Traffic Collision Avoidance System (TCAS) in the one or more traffic vehicles and ownship, as well as the usage status of runway Land and Hold Short Operations (LAHSO), to ascertain whether a runway, or a runway portion, is "Not-In-Use". Moreover, it will be appreciated that in order to minimize inaccurate "Not-In-Use" status indication, factors such as whether a traffic vehicle is aligned within a predetermined angle of the runway heading, ownship heading, traffic and ownship track, and ownship traffic and ground speed may be used as determinative factors. Lastly, a time delay may also be used to filter out one or more traffic vehicles that only momentarily have the potential to intersect ownship or trigger runway status.

A runway is generally determined to be "Unoccupied" when no traffic vehicle is present in the monitored volume corresponding to the runway. However, in another embodiment, a runway may be considered "Unoccupied" when all traffic vehicles within the monitored volume are no longer factors to be monitored by ownship (e.g., when all departing traffic vehicles lift off the runway or pass the end of the runway).

A runway is generally determined to be "Restricted" when the positions, headings, tracks, or travel of ownship and at least one traffic vehicle are such that an imminent or hazardous traffic conflict/collision between at least one traffic vehicle and ownship exists, or could exist if ownship is to enter the runway's corresponding monitored volume. For example, a runway is determined to be "Restricted" when at least one traffic vehicle is in the monitored volume, the at least one traffic vehicle is below a predetermined altitude and above a predetermined speed, and the distance between the at least one traffic vehicle and ownship is decreasing. In one embodiment, the predetermined altitude is 300 feet and the predetermined speed is 50 knots. However, in another embodiment, in addition to satisfying the above criteria, the headings of the at least one traffic vehicle must also be within predetermined degrees of runway heading, such as 30 degrees, in order to trigger a "Restricted" status indication. This prevents inaccurate or false "Restricted" status indications. In another embodiment, a time delay may also be used to filter out one or more traffic vehicles that only momentarily have the potential to conflict or collide with ownship. In additional embodiments, other ownship or traffic information may also be used to filter out one or more traffic vehicles that pose momentary conflict or collision threats, or which would otherwise undesirably trigger the "Restricted" status.

Nevertheless, it will be appreciated that in other embodiments of "Restricted" determinations, combinations of one or more factors, such as the ground speed of ownship and one or more traffic vehicles, the airspeed of ownship and one or more traffic vehicles, the altitude of ownship and one or more traffic vehicles, the thrust settings of ownship and one or more traffic vehicles, as well as variation in these factors, may also be used to determine whether imminent or hazardous potential for ownship and traffic vehicle conflicts or collisions exist, and consequently, whether a runway is "Restricted." In other embodiments, these factors may be further combined with other relevant data, such as the power mode (e.g., on/standby) of the TCAS in one or more traffic vehicles and ownship, as well as the usage status of LAHSO, to ascertain whether a runway, or a runway portion, is "Restricted". Finally, it will also be appreciated that combinations of only one or some of the runway status described above, e.g., "Unoccupied", "Occupied", "In-use", "Not-in-Use", and "Restricted", may be implemented for display.

Automatic display range control module 302 further comprises a crew selectable (on/off) automatic range control mode/function. The mode/function is manually enabled by crew selection or traffic and automatically enabled by other logical conditions such as but not limited to, an air/ground state indication, in level flight, on approach, within some predetermined altitude and distance of destination airport/runway, approaching, near, or on a runway during a change in runway status. Once enabled and activated the mode/function automatically and continuously changes display range in predetermined increments to optimize the display of the runway and associated operational information such as but not limited to relevant traffic, stationary references, and/or entire runway length. The mode/function is deactivated by crew selection or other logical conditions, for example, but not limited to TOGA, touchdown, aircraft groundspeed, a minimum predetermined display range such as 2 nautical miles, or a change in runway status. In an alternative embodiment, the crew selectable automatic range control mode/function may be three state—On, Reset, and Off. The 'reset' state would deactivate autorange and return the display to the manually selected range. However, autorange would remain enabled for the next 'new' set of logical conditions programmed to activate autorange.

Automatic display range control module 302 enables implementation/application of new safety-related EAMM applications and functions without increasing crew workload to unacceptable levels thereby reducing the usefulness of EAMM 114. Autorange can reduce current crew manual ranging workload.

Automatic display range control module 302 utilizes ownship data/info, traffic data/info, airport map data/info, pilot inputs, and preprogrammed software code. During operation, on or before approach, the pilot selects AutoRange for EAMM 114 display. AutoRange activates at some predetermined point on approach, for example, but not limited to, in air, glideslope/localizer capture, at final approach fix, or within some predetermined altitude or distance of the destination airport/runway or area or interest. Once activated, automatic display range control module 302 continuously changes display range or range setting in small or otherwise predetermined increments to optimize the display of the approach runway and associated operational information. For example, display of the entire approach runway length and/or runway traffic is maintained and optimized throughout the approach and landing. Automatic display range control module 302 may be deactivated, reset or disabled by crew selection or other logical conditions, for example, but not limited to TOGA, touchdown, ownship groundspeed, the selected EFIS panel range, and/or a minimum predetermined display range such as 1 nautical mile. During ground taxi near, approaching, or on a runway, automatic display range control module 302 automatically changes display range out to display any significant traffic associated with the runway status. The display then ranges inward in small or otherwise predetermined increments to optimize the display of the runway and associated operational information until the original selected EFIS panel range is once again displayed.

Embodiments of the disclosure facilitate reducing manual flight crew ranging associated with the display of EAMM runway related operational information during taxi, takeoff, and on approach and in the airport vicinity. Such embodiments further facilitate optimizing the display of such operational information on an EAMM of the airport surface by utilizing the ranges available between existing discrete range selections by automatically and continuously zooming range in very small increments to provide a near continuous range display capability. Alternative embodiments of the disclosure facilitate reducing manual flight crew ranging associated with the off airport display of traffic and other operational information when ownship is in enroute or in the terminal area away from the airport.

Figure 4:
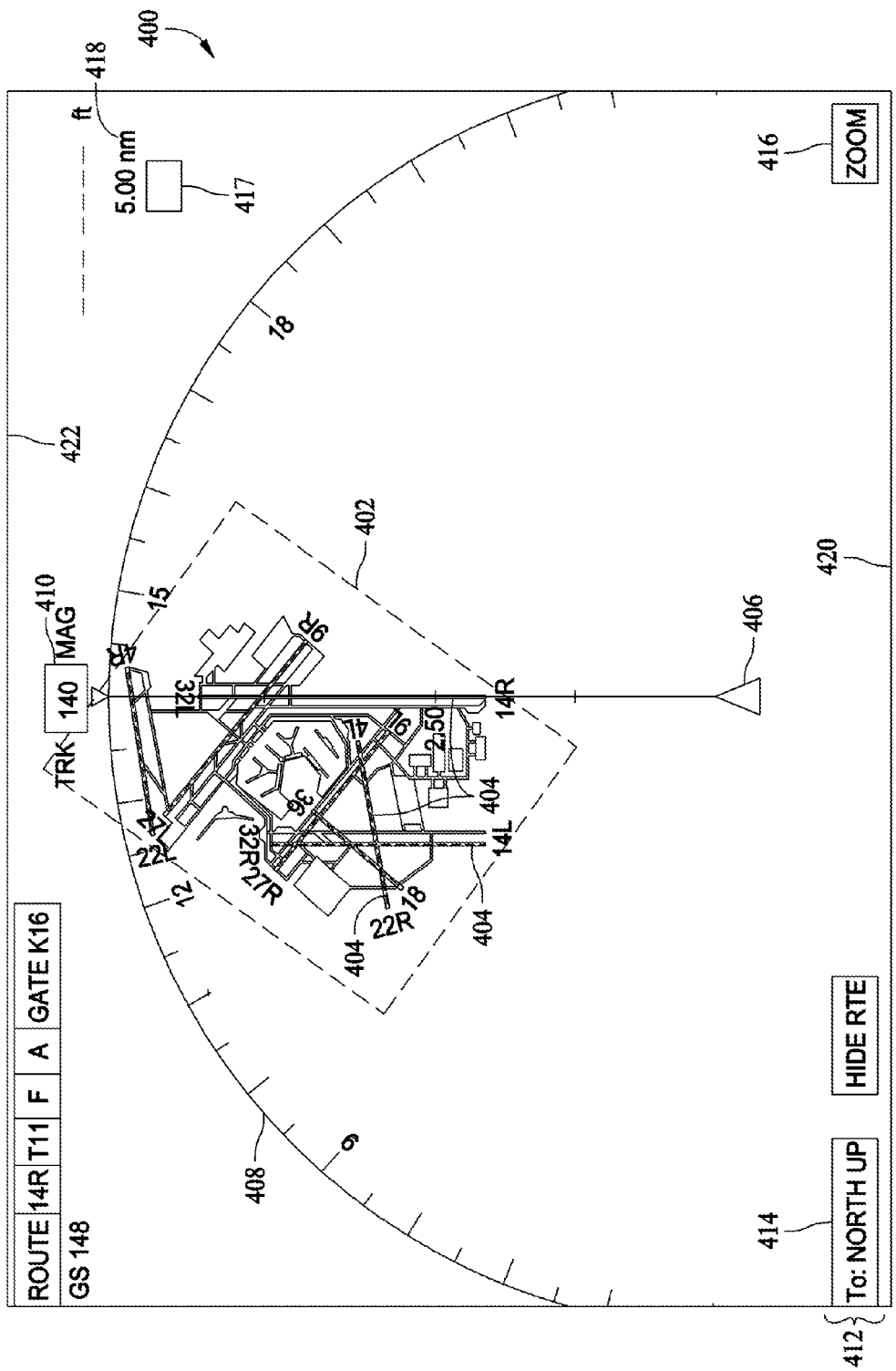
FIG. 4 is a screen capture of an exemplary display of EAMM during a landing approach.

FIG. 4 is a screen capture of an exemplary display 400 of EAMM 114 during a landing approach. Display 400 illustrates a moving map display of an airport 402 including a plurality of runways 404 designated by the compass heading of the runway layout as is typical. Display 400 also illustrates an ownship depiction 406 that comprises a triangularly shaped icon on display 400. A compass rose 408 indicates a current heading of ownship and a heading display 410 indicates ownship heading digitally. A trackline indication extending from the ownship symbol 406 to the digital ownship heading 410 represents the selected display range. Optional softkeys 412 are aligned along a bottom of display 400 for selecting a course up or north up display orientation 414, manual zoom 416, and other display functions. A range display scale 418 indicates the current range setting of display 400. An "AutoRange" indication 417 positioned directly below the range display scale indicates autorange is selected on. The absence of such indication indicates autorange is selected off. In the exemplary embodiment, range display scale 418 indicates a range scale of 5.00 nautical miles, which indicates, for example that a distance from ownship symbol 406 to the digital ownship heading 410 on display 400 represents substantially 5.00 nautical miles. The range display is manually selected by a user or may be automatically selected by EAMM 114 based on algorithms executing in EAMM 114. In an alternative embodiment, autorange 'activation' may be indicated on the display.

During operation, as ownship 406 approaches airport 402, EAMM 114 continuously monitors predetermined objects associated with display 400 to change range display scale 418 continuously or in predetermined increments, to maintain airport 402 and the predetermined objects viewable in display 400. The user may select manual zoom 214 or 416 to adjust range display scale 418. In one embodiment, the selection of range display scale 418 is by steps, such as 5.00 nm, 4.00 nm, 3.00 nm. In another embodiment, the selection of range display scale 418 is substantially continuous, for example, 5.00 nm, 4.99 nm, and 4.98 nm. When autorange is on and active, manual selection 256 or 416 of range values above or below the autorange value may have no effect (autorange continues to operate), may have a permanent effect (autorange turns off until reselected on), or may have a temporary effect (autorange temporarily turns off for some preselected time). In another embodiment, the automatic selection of the range display scale is by steps, such as 5.00 nm, 4.00 nm, 3.00 nm, for example. In another embodiment, the selection of range display scale 418 is substantially continuous, for example, 5.00 nm, 4.99 nm, and 4.98 nm. The selection to manual zoom 214 or 416 may be permanent such that the user is required to switch back to automatic zoom control, or the selection to manual zoom may be timed such that after a predetermined time period the zoom function is automatically switched back to automatic.

Figure 5:
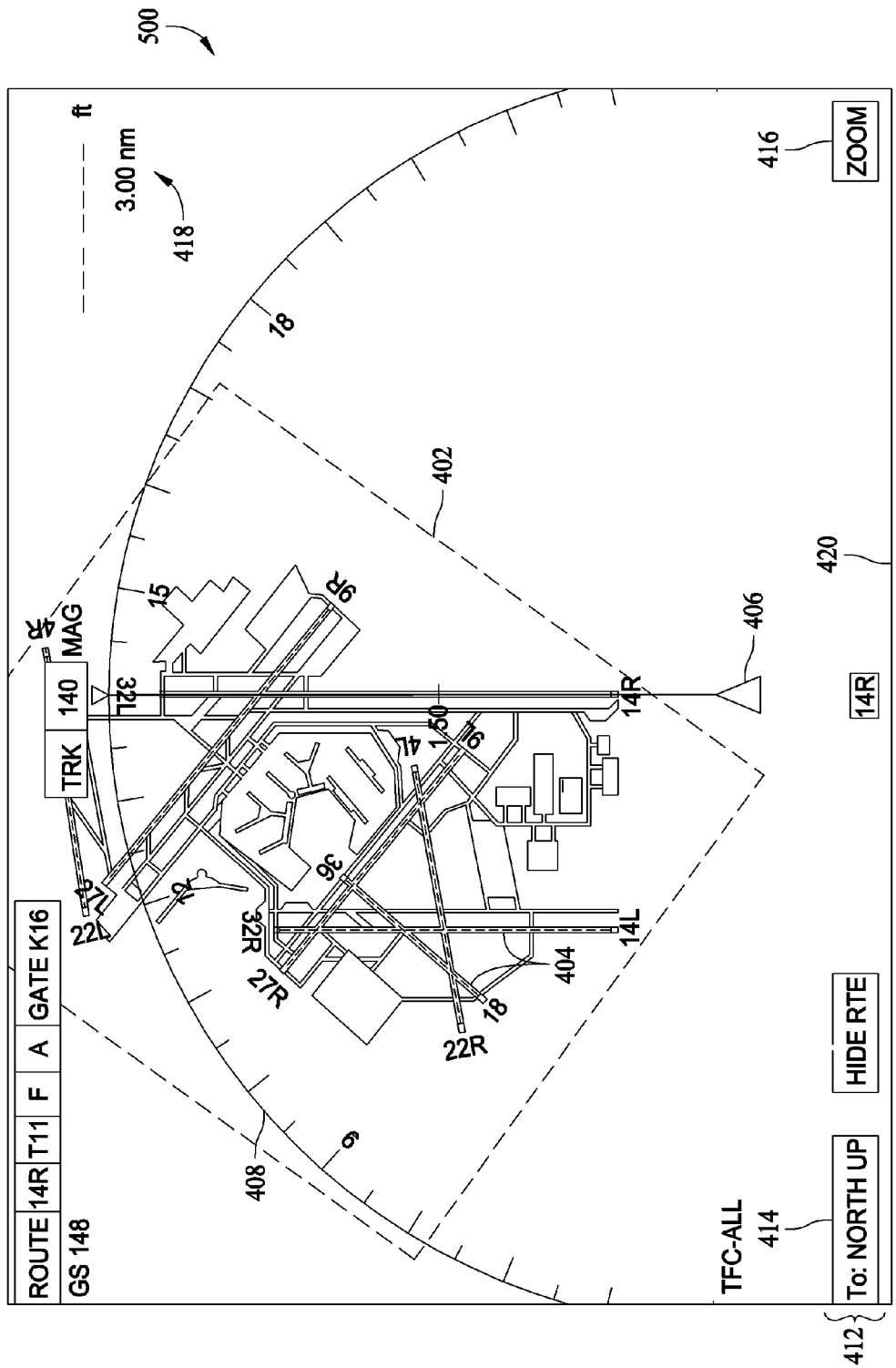
FIG. 5 is a screen capture of another display of EAMM during the landing approach shown in FIG. 4.

FIG. 5 is a screen capture of another display 500 of EAMM 114 during the landing approach (shown in FIG. 4). Display 400 illustrates a moving map display of airport 402 and ownship depiction 406 that is closer to airport 402 permitting a higher range setting display corresponding to a range display scale 418 value of 3.00 nm. Range display scale 418 indicates the current range setting of display 400. In the exemplary embodiment, range display scale 418 indicates a range scale of 3.00 nautical miles, which indicates for example that a distance from the ownship symbol 406 to the digital ownship heading 410 represents substantially 3.00 nautical miles.

Figure 6:
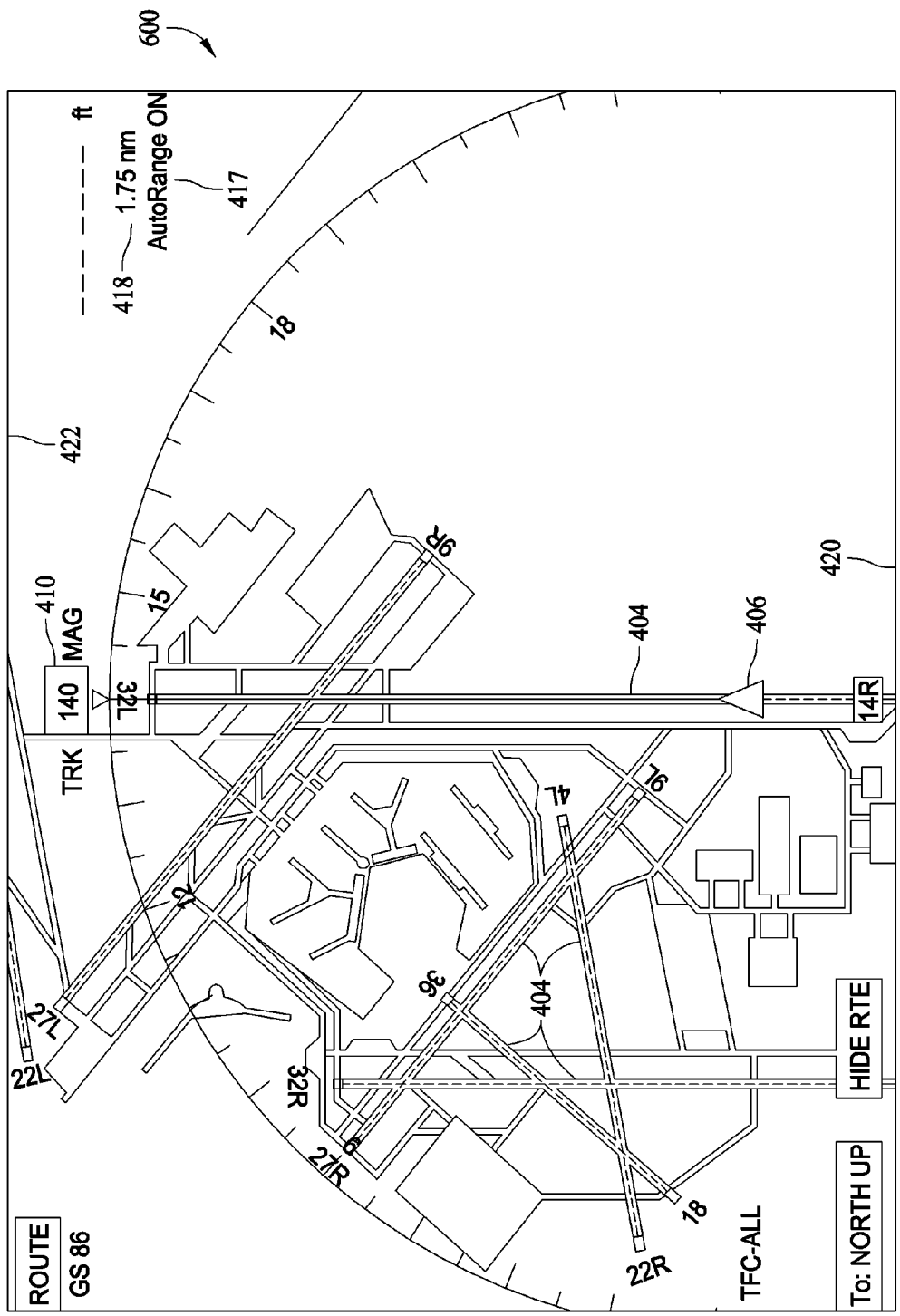
FIG. 6 is a screen capture of another display of EAMM during the landing approach shown in FIG. 4.

FIG. 6 is a screen capture of another display 600 of EAMM 114 during the landing approach (shown in FIG. 4). Display 400 illustrates a moving map display of airport 402 and ownship depiction 406 wherein ownship depiction 406 has reached the runway 404 designated 14R permitting a higher range setting display corresponding to a range display scale 418 value of 1.00 nm. Range display scale 418 indicates the current range setting of display 400. In the exemplary embodiment, range display scale 418 indicates a range scale of 1.00 nautical mile, which indicates for example that a distance from a the ownship symbol 406 to the digital ownship heading 410 represents substantially 1.00 nautical mile.

During operation EAMM 114 continually monitors ownship and other aircraft positions and paths of those aircraft and ownship to determine conflicts and potential conflicts between the paths of aircraft currently traversing the taxiways. Autorange may be programmed to optimize the display of the taxi route. If a taxiway crosses a runway 404, EAMM 114 monitors inbound and outbound traffic to determine potential or actual traffic conflicts and autoranges to display such traffic. In some cases a traffic conflict alert may be displayed.

Figure 7:
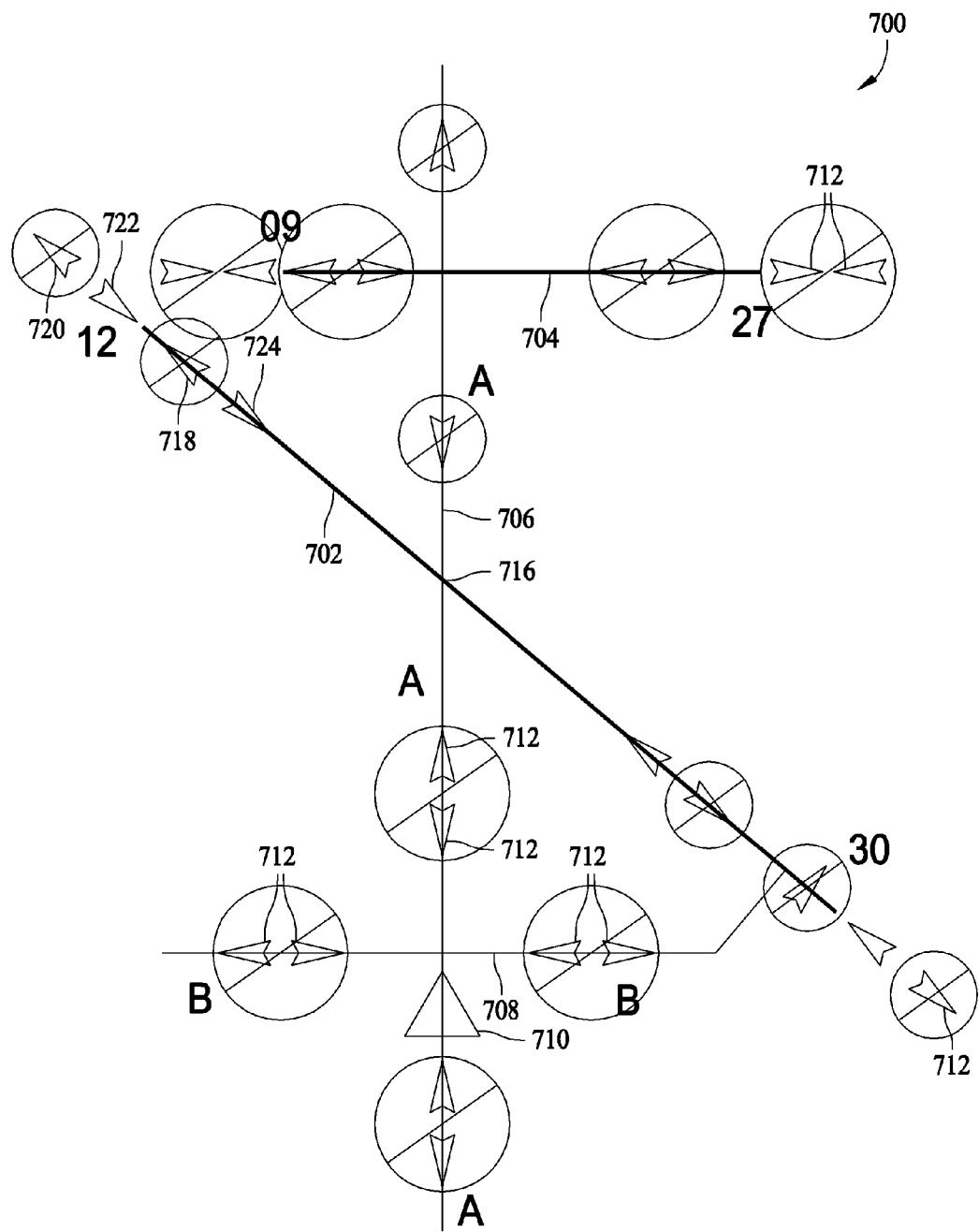
FIG. 7 is a schematic view of an exemplary layout of runways and taxiways for displaying offscale traffic during taxi, takeoff, or approach/landing in accordance with an embodiment of the disclosure.
Figure 8:
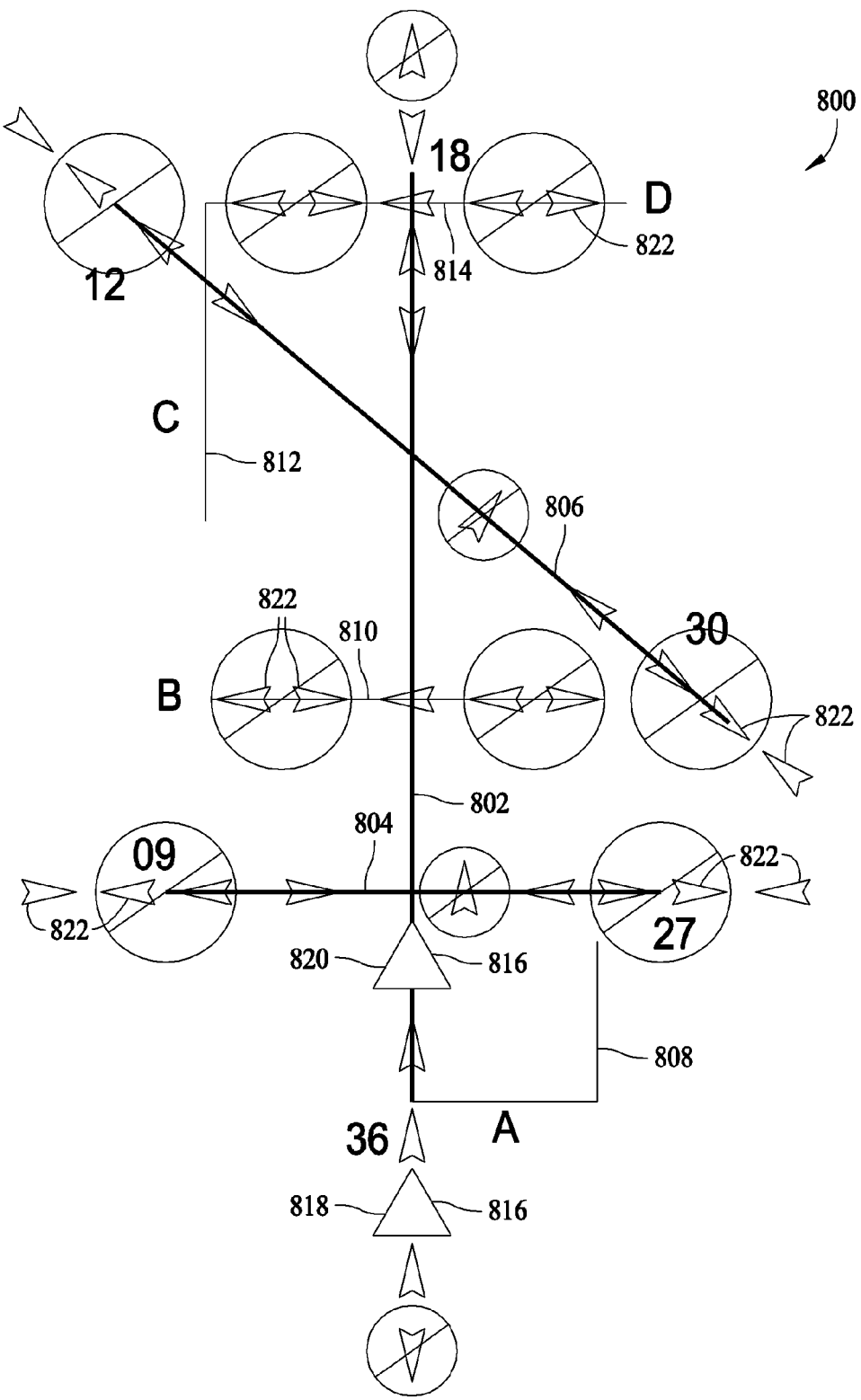
FIG. 8 is a schematic view of an exemplary layout of runways and taxiways for displaying offscale traffic during taxi, takeoff, or approach/landing in accordance with an embodiment of the disclosure.
Figure 9:
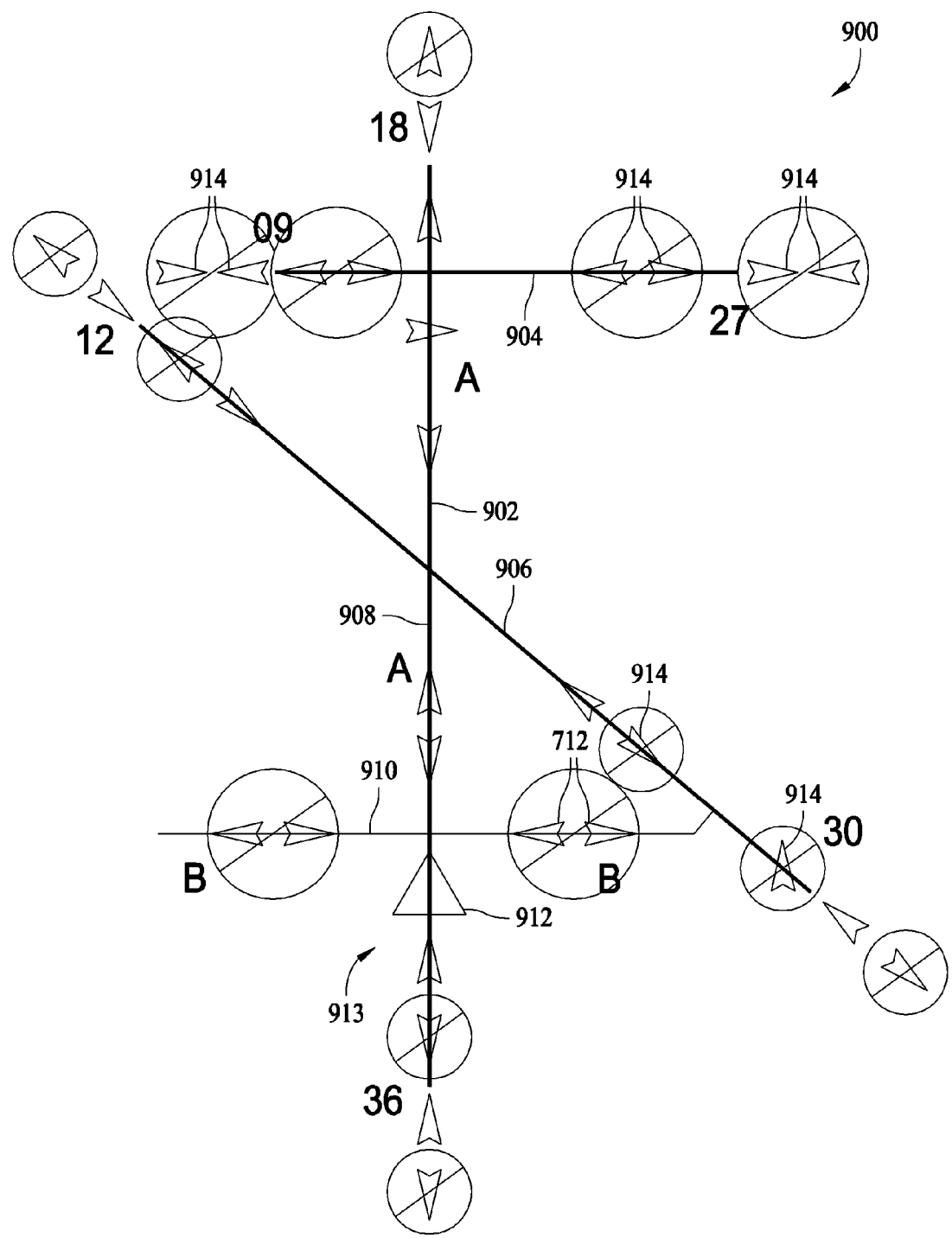
FIG. 9 is a schematic view of an exemplary layout of runways and taxiways for displaying ownship runway offscale traffic during taxi, takeoff, or approach/landing in accordance with an embodiment of the disclosure.

FIG. 7 is a schematic view of an exemplary layout 700 of runways and taxiways for displaying offscale traffic during ownship taxi in accordance with an embodiment of the disclosure. Layout 700 includes a runway 702 designated "30/12", a runway 704 designated "27/09", a taxiway 706 designated "A", and a taxiway 708 designated "B". Layout 700 also includes an ownship depiction 710 oriented along taxiway 706 and a plurality of other aircraft depictions 712 that represent possible locations and orientations for offscale aircraft traffic in the vicinity of ownship 710. At least some of the other aircraft depictions 712 include an international "NO"

symbol overlaid on the other aircraft depictions 712. Such positions and orientations are possible but do not activate autorange and are not considered in the present description of FIG. 7. Note that these international "NO" symbols used in FIGS. 7, 8, and 9 are used for discussion and explanation only the traffic symbols and the international "NO" symbols are not displayed on flight deck or airport map displays.

As used herein, offscale traffic is defined as aircraft that are determined to pose an actual or potential collision risk to ownship and that are currently located beyond the display perimeter of EAMM 114. For example, an aircraft on approach to a runway that crosses a taxiway ownship is traversing. If range display scale 418 is selected to a range scale of 1.00 nautical mile and the inbound aircraft is greater than 1.0 nm from ownship, the aircraft will not be displayed on EAMM 114.

An offscale traffic autorange is a function of EAMM 114 that automatically changes range display scale 418 to a value that permits the inbound aircraft to be displayed on EAMM 114 and in various embodiments, also provides visual and/or aural cues that offscale traffic autorange has taken place and identifies the aircraft involved, and provides traffic groundspeed and distance from ownship. Offscale traffic autorange automatically provides a plan view visual of offscale traffic and its relative location and distance from ownship.

In the exemplary embodiment, only occupied, in-use, or restricted runway status traffic triggers offscale traffic autorange. However, not all runway status traffic triggers offscale traffic autorange. In the exemplary embodiment, only runway status traffic whose tracks intersects or potentially could intersect ownship track or ownship at or in the vicinity of a taxiway-runway intersection or a runway-runway intersection triggers offscale traffic autorange. In an alternative embodiment, traffic that is traversing other runways and taxiways may also trigger offscale traffic autorange. Ownship and traffic tracks that intersect at or in the vicinity of a taxiway-runway intersection or a runway-runway intersection may trigger offscale traffic autorange.

For taxi, intersecting at or in the vicinity of a taxiway-runway intersection or a runway-runway intersection corresponds to the next intersecting runway intersection ahead of ownship. For takeoff and landing, intersecting at or in the vicinity of a taxiway-runway intersection or a runway-runway intersection corresponds to any runway intersection ahead of ownship. Cases where ownship track intersects the traffic and where traffic track intersects ownship are also included. Such cases generally occur in the same runway volume. Additionally, other traffic conflict cases where traffic or ownship is taking off or landing on a taxiway, and taxiway-taxiway traffic conflicts are also addressed. Further, cases where taxi traffic is approaching a runway that ownship is using for takeoff or landing are addressed as well.

During ownship taxi, autorange activates for offscale traffic in the same runway volume as ownship, and for offscale traffic in the next intersecting runway volume that is in a position to conflict or potentially conflict with ownship. Autorange is enabled when selected on. Autorange activates to display offscale traffic (on the next runway that intersects the taxiway or runway ownship is taxiing on) when the traffic track intersects or potentially could intersect ownship track. For example, for stationary traffic pointed/poised to intersect ownship track, or for traffic moving towards the point where ownship and traffic tracks intersect). Traffic must be less than a predetermined height above ground level. For intersecting runways during taxi, only the next intersecting runway intersection ahead of ownship is of interest for autorange to display offscale traffic.

The top level logic that activates autorange to display offscale traffic during taxi includes:
  offscale traffic less than a predetermined height above ground level in next intersecting runway in route, OR
  offscale traffic less than a predetermined height above ground level in next runway intersecting current ownship taxiway segment, OR
  offscale traffic less than a predetermined height above ground level in any runway volume ownship is in on-ground.

It should be noted that "OR offscale traffic less than a predetermined height above ground level in any runway volume ownship is in on-ground" logic also applies to the takeoff and landing runways, but not to the intersecting runways once takeoff or landing runway is true. In the exemplary embodiment, all traffic in FIG. 7 is assumed to be offscale of ownship display, taxiway 'B' 708 intersects taxiway 'A' 706, on which ownship 710 is taxiing, however, traffic 712 on taxiway 'B' 708 does not activate autorange to display offscale traffic. Runway 12/30 also intersects taxiway 'A' at point 716. Traffic on or approaching runway 12/30 are only a threat to ownship 710 if a path of the traffic will cross point 716. For example, aircraft represented by depictions 718 and 720 are outbound from point 716 and therefore will not cross runway 12/30. Aircraft represented by depictions 722 and 724 are inbound towards point 716 and therefore will cross runway 12/30 in FIG. 7 posing a threat to ownship 710. In an alternative embodiment, a time of crossing point 716 may be determined based on a speed of the aircraft represented by depictions 722 and 724 and compared to a time that ownship will cross point 716. If the aircraft or ownship will pass point 716 with a sufficient predetermined safety margin of time autorange may not need to be activated.

FIG. 8 is a schematic view of an exemplary layout 800 of runways and taxiways for displaying offscale traffic during takeoff, or approach/landing in accordance with an embodiment of the disclosure. All traffic in FIG. 8 is assumed to be offscale of ownship display. Layout 800 includes a runway 802 designated "36/18", a runway 804 designated "27/09", a runway 806 designated "30/12", a taxiway 808 designated "A", a taxiway 810 designated "B", a taxiway 812 designated "C", and a taxiway 814 designated "D". Layout 800 also includes an ownship depiction 816 oriented in a first position 818 approaching runway 802 and in a second position 820 taking off along runway 802 and a plurality of other aircraft depictions 822 that represent possible locations and orientations for aircraft in the vicinity of ownship 816. At least some of the other aircraft depictions 822 include an international "NO" symbol overlaid on the other aircraft depictions 822. Such positions and orientations are possible but do not activate autorange and are not considered in the present description of FIG. 8.

During ownship takeoff or approach/landing, autorange to display offscale traffic is activated for offscale traffic in any intersecting runway volume if the traffic is moving (groundspeed >5 knots), and the traffic is less than a predetermined height above ground level, and the traffic and ownship tracks intersect. Once true, the takeoff and landing runway should be considered such until ownship passes the end of runway on takeoff or leaves the landing runway volume. The takeoff and landing runway should also be considered an 'ownship runway' for the purposes of offscale traffic display. Takeoff and approach/landing runways should be considered taxi runways until ownship is aligned within 30 degrees of the runway heading.

As used herein, a takeoff runway is defined as the departure runway in taxi-out route, OR any runway volume ownship is in, aligned within 30 degrees of runway heading, and with L or R ownship thrust >80%.

The top level logic that initiates autorange to display offscale traffic during ownship takeoff includes:

Ownship on ground AND
Ownship in runway volume AND
Ownship aligned within 30 degrees of runway heading AND
[runway is taxi route takeoff runway OR left engine N1>0.8 OR right engine N1>0.8].

In an alternative embodiment, "AND takeoff flaps [5 OR 15 OR 20], OR ownship groundspeed >50 knots, are added to the logic.

As used herein, approach/landing runway is defined as the landing runway in taxi-in route, or any runway volume not already defined as a takeoff runway ownship is within in-air with ownship heading within 30 degrees of that runway heading.

The top level logic that initiates autorange to display offscale traffic during ownship approach/landing includes:

Ownship in-air AND in runway volume AND
ownship aligned within 30 degrees of the runway heading, AND
not a takeoff runway.

In an alternative embodiment, altitude, landing flaps 25 or 30, on glideslope/localizer, or other logic may be included to determine landing runway if necessary. In another alternative embodiment, "AND ownship groundspeed >50 knots," may be included to the logic to terminate landing runway after landing.

To address ownship back taxi, ownship is considered on the route takeoff or landing runway when ownship heading is within 30 degrees of the takeoff or landing runway heading not the reciprocal.

The top level logic that initiates autorange display of offscale traffic during ownship approach/landing is limited to use with the takeoff and landing runway and is not applied to taxi runways. Additionally, during takeoff or approach/landing filtering of traffic movement on an intersecting runway that occurs within a predetermined distance of the runway threshold such as 500 feet is permitted to allow traffic to taxi into position and hold on an intersecting runway without activating traffic autorange. Holding may be determined by a speed of <5 knots. In an alternative embodiment, traffic thrust setting may be used to determine traffic takeoff intent.

FIG. 9 is a schematic view of an exemplary layout 900 of runways and taxiways for displaying 'ownship runway' offscale traffic during taxi, takeoff, or approach/landing in accordance with an embodiment of the disclosure. All traffic in FIG. 9 is assumed to be offscale of ownship display. Layout 900 includes a runway 902 designated "36/18", a runway 904 designated "27/09", a runway 906 designated "30/12", a taxiway 908 designated "A", and a taxiway 910 designated "B". Layout 800 also includes an ownship depiction 912 oriented in a first position 913 on runway 902 and a plurality of other aircraft depictions 914 that represent possible locations and orientations for aircraft in the vicinity of ownship 912. At least some of the other aircraft depictions 914 include an international "NO" symbol overlaid on the other aircraft depictions 914. Such positions and orientations are possible but do not activate autorange and are not considered in the present description of FIG. 9.

For ownship runway 902 during taxi, takeoff, or landing, autorange or display indication for offscale traffic on ownship runway is displayed when:

any traffic is on the ground or in the air, and in same runway volume, and ahead of ownship, OR
any traffic is on ground, and in same runway volume, and the heading is within 30 degrees of runway heading, and traffic is converging on ownship, OR
any traffic in air less than a predetermined height above ground level, and in same runway volume, and heading within 30 degrees of runway or reciprocal (opposite direction) runway heading, and converging on ownship.

As used herein, ownship runway is defined as ownship in runway volume and aligned within 30 degrees of the runway heading.

Figure 10A:
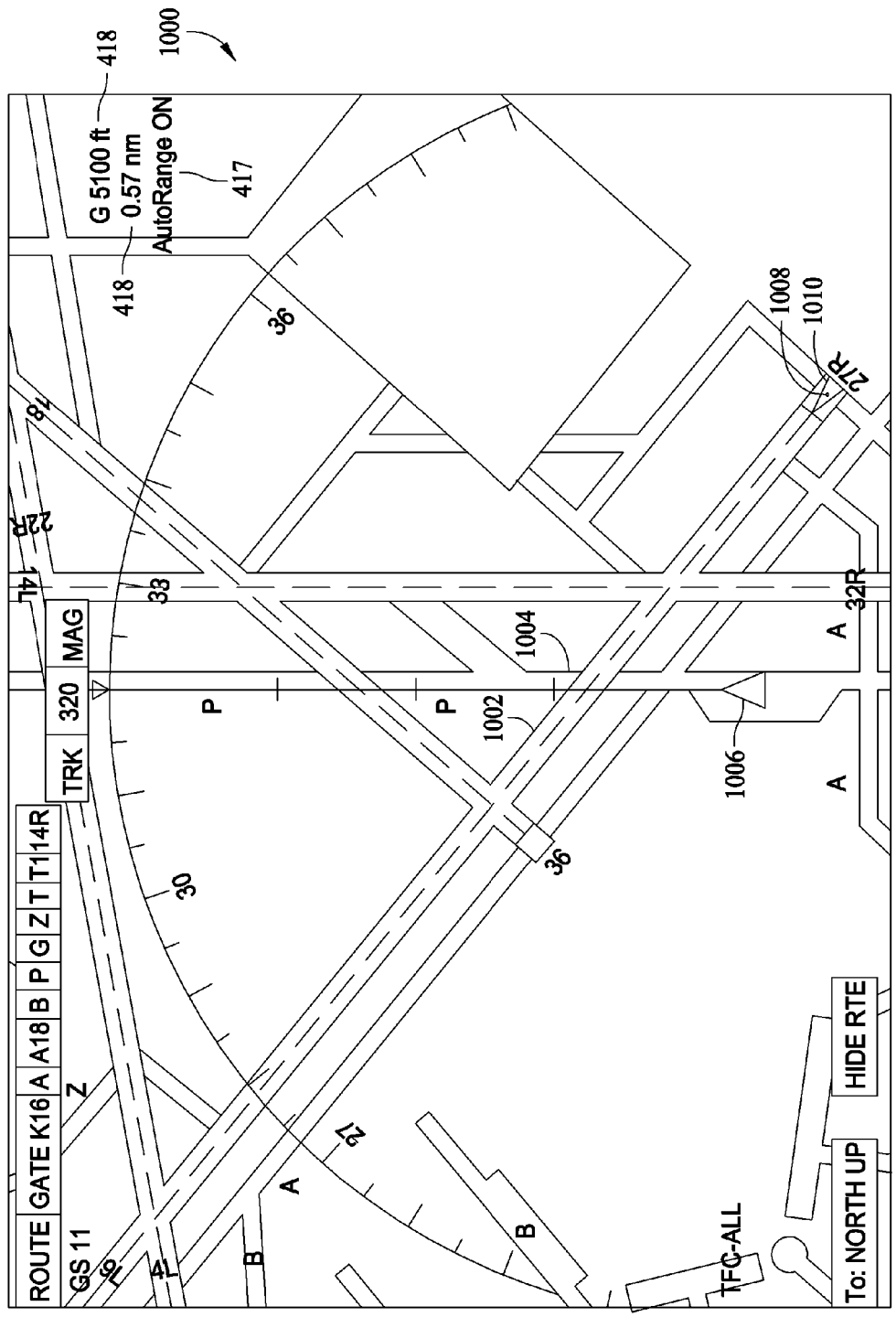
FIG. 10 is a screen capture of a display of EAMM for indicating runway occupied status during taxi, takeoff, or approach/landing.

FIG. 10a is a screen capture of a display 1000 of EAMM 114 for runway occupied autorange during taxi, takeoff, or approach/landing. Display 1000 illustrates a moving map display of an airport and ownship depiction 1006 for a next runway (27 R) 1002 crossing a taxi route 1004 of ownship 1006. Traffic 1008 on the next runway (27 R) 1002 is occupying a threshold 1010 of next runway (27 R) 1002. Traffic 1012 on runway (18) 1014 (shown in FIG. 10b) is taxiing on the runway (18) 1014. Traffic 1012 is not shown on display 1000 because the autorange logic is not satisfied for displaying traffic 1012 until runway (18) 1014 becomes "the next intersecting runway in route" after ownship 1006 passes runway (27 R) 1002.

Runway status is determined, and while used for offscale traffic autorange runway status may or may not be displayed during taxi for:

the next intersecting runway in route OR
the next runway intersecting current ownship taxiway segment OR
any runway volume ownship is in on-ground.

In an alternative embodiment, an "OR any runway volume ownship is in on-ground" logic may be included and applies to the takeoff and landing runway, but not to the intersecting runways once takeoff or landing runway is true. This is intended to prevent nuisance runway status indications or autorange during takeoff and landing as ownship crosses those intersecting runways.

Runway status is used for offscale traffic autorange, but may or may not be displayed during takeoff for the departure runway in taxi-out route, or any runway volume ownship is in, aligned within 30 degrees of runway heading, and the left or right engine ownship thrust >80%.

The top level logic used to determine takeoff or departure runway for the purposes of runway status indication includes:

Ownship on ground AND
ownship in runway volume AND
ownship aligned within 30 degrees of runway heading AND
runway is taxi route takeoff runway OR
left engine N1>0.8 OR
right engine N1>0.8.

In an alternative embodiment, an "AND takeoff flaps 5 OR 15 OR 20, OR ownship groundspeed >50 knots" may be included in the top level logic.

Runway status is used for offscale traffic autorange, but may or may not be displayed during approach/landing when the landing runway is in taxi-in route, or any runway volume ownship is within in-air with ownship heading within 30 degrees of runway heading.

The top level logic used to determine approach/landing runway for the purposes of runway status indication includes:

Ownship in-air AND in runway volume AND
ownship aligned within 30 degrees of runway heading.

In an alternative embodiment, an altitude, landing flaps at 25 or 30 degrees, on glideslope/localizer, or other logic may be included to determine landing runway. In another alternative embodiment, an "AND ownship groundspeed >50 knots" logic statement may be included in the top level logic to terminate landing runway after landing.

For the purposes of runway status display, ownship runway is defined as ownship in runway volume and aligned within 30 degrees of runway heading during taxi, takeoff, or approach/landing as described above.

During taxi, the next intersecting runway status is used for offscale traffic autorange, but runway status may or may not be displayed for any traffic in the intersecting runway volume regardless of traffic heading or speed. For takeoff and landing, intersecting runway status is used if traffic is in the intersecting runway volume, traffic is moving, for example, groundspeed >5 knots, and traffic and ownship tracks intersect at or near the runway intersection. The intersecting runway status display logic is the same for takeoff and landing runways. The objective is to filter out non-threat unnecessarily distracting intersecting runway status indications or offscale autorange activations. Note that this logic is included so that the intersecting runways ownship passes through during takeoff and landing do not become takeoff or landing runways or ownship runway.

Display 1000 illustrates an occupied runway status for a next runway 1002 crossing a taxi route 1004 of ownship 1006. Next runway 1002 is defined as a runway that ownship is in a position to enter or cross as it taxis. Next runway 1002 may be based on a cleared taxi route or on the current taxiway segment as determined by ownship position. Other factors such as ownship heading or travel may be considered.

Figure 10B:
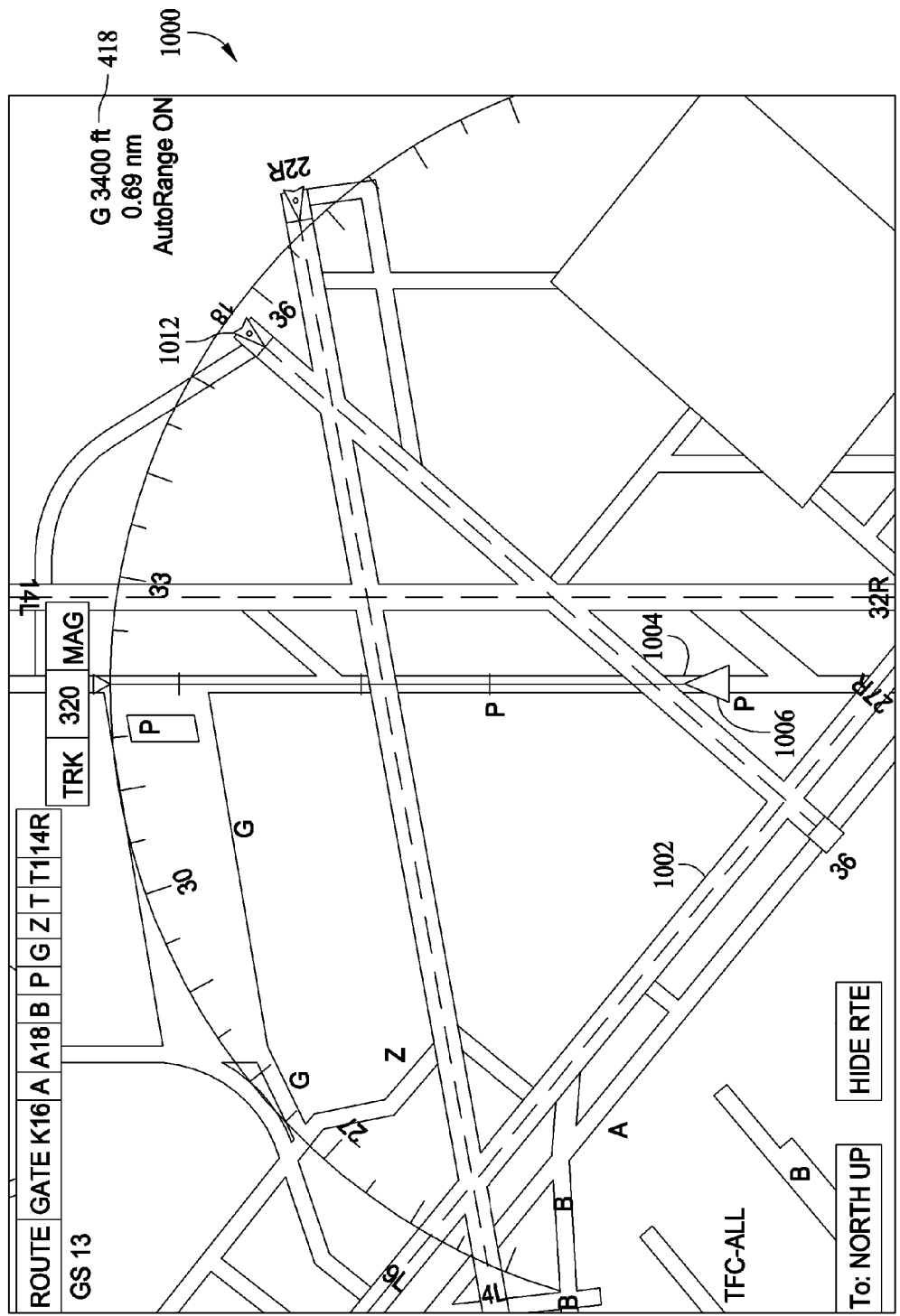

FIG. 10b is a screen capture of a display 1000 of EAMM 114 for runway occupied autorange during taxi, takeoff, or approach/landing. Display 1000 illustrates a moving map display of an airport and ownship depiction 1006 for a next runway (27R) 1002 crossing a taxi route 1004 of ownship 1006. Traffic 1008 on the next runway (27R) 1002 is occupying a threshold 1010 of next runway (27R) 1002. Traffic 1012 on runway (18) 1014 (shown in FIG. 10b) is taxiing on the runway (18) 1014. Traffic 1012 is now shown on display 1000 because the autorange logic is satisfied for displaying traffic 1012 because runway (18) 1014 is now "the next intersecting runway in route" because ownship 1006 has passed runway (27R) 1002.

Figure 11:
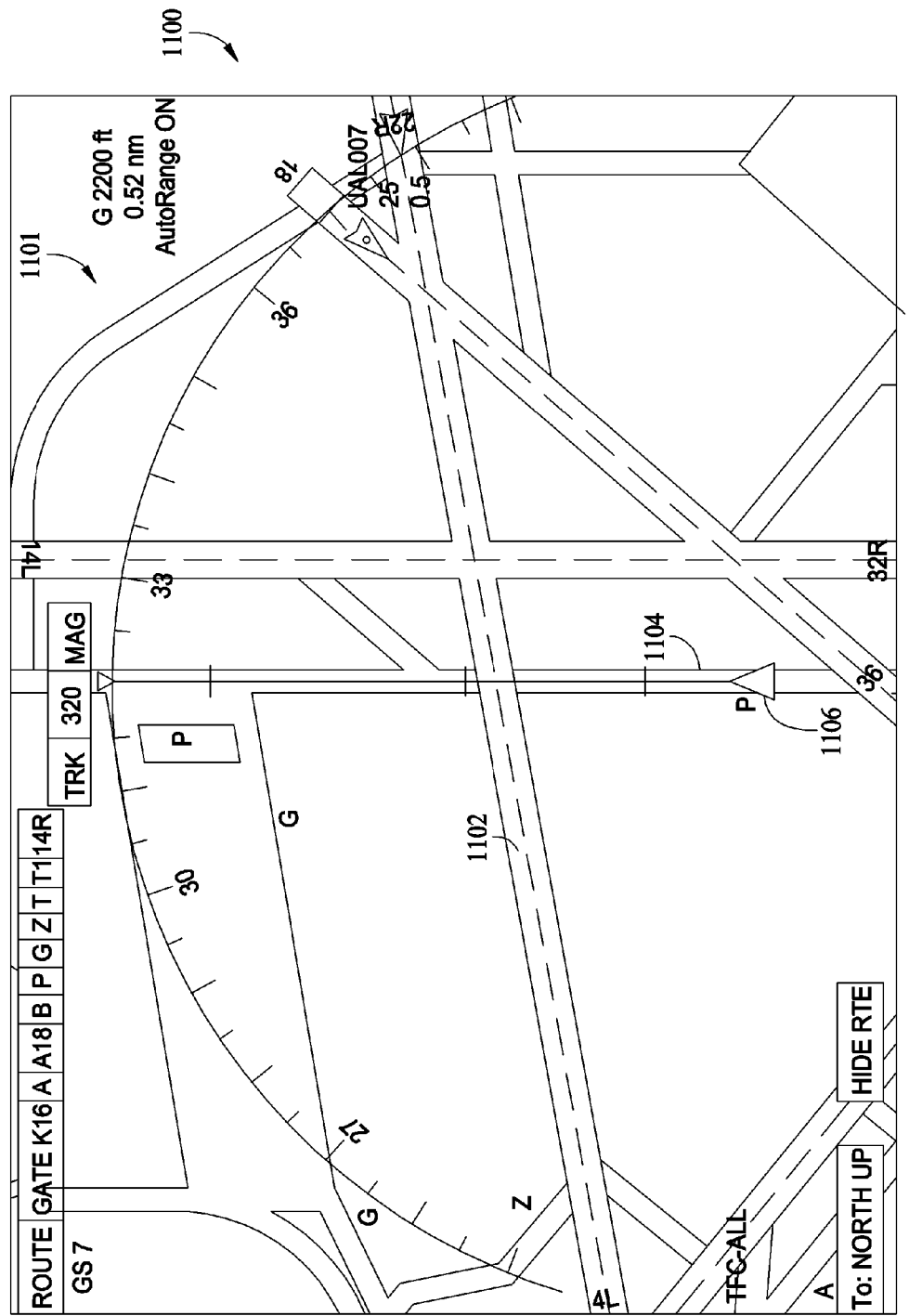
FIG. 11 is a screen capture of a display of EAMM for indicating runway in use status during taxi, takeoff, or approach/landing.

FIG. 11 is a screen capture of a display 1100 of EAMM 114 for indicating runway restricted status autorange during taxi., takeoff, or approach/landing. Display 1100 illustrates a moving map display of an airport 1101 and ownship depiction 1106 for a next runway (22R) 1102 crossing a taxi route 1104 of ownship 1106. Traffic on next runway (22R) 1102 is on takeoff roll.

Figure 12:
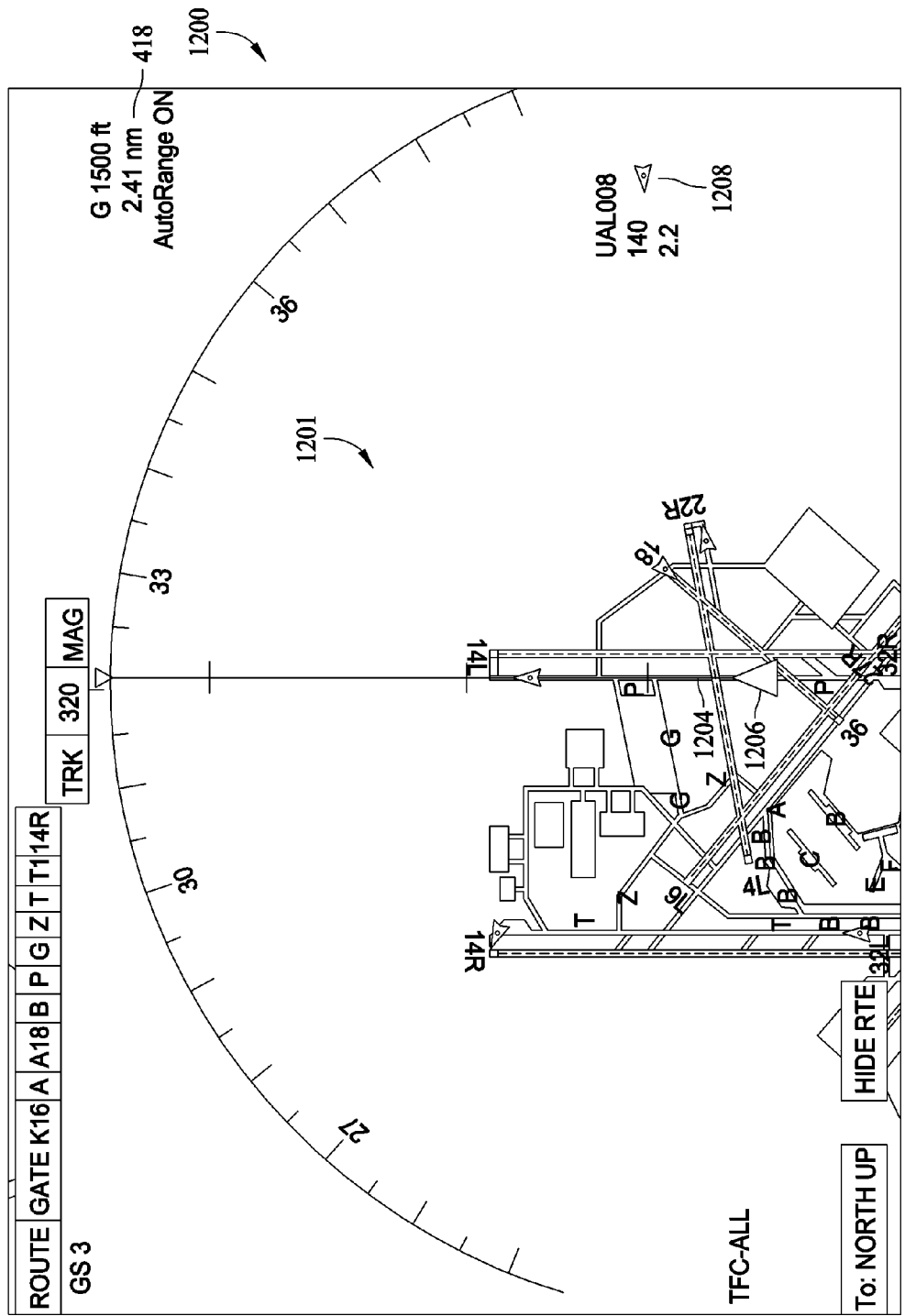
FIG. 12 is a screen capture of a display of EAMM for indicating runway in-use status autorange during taxi, take-off, or approach/landing.

FIG. 12 is a screen capture of a display 1200 of EAMM 114 for indicating runway in-use status autorange during taxi., takeoff, or approach/landing. Display 1200 illustrates a moving map display of an airport 1201 and ownship depiction 1206 for a next runway (22R) 1202 crossing a taxi route 1204 of ownship 1206. Traffic 1208 is on approach to next runway (22R) 1202. Approach autorange logic changed the range setting 418 out to 2.41 nm to display traffic 1208.

As described above, the takeoff runway and the landing runway, whether established by route or inferred by off-route logic is determined to be a takeoff or landing runway if ownship is aligned with the runway and in the runway volume. Intersecting runway status is displayed accordingly. Unless alternative logic is specified, once ownship leaves the takeoff or approach/landing runway volume, the system reverts to taxi logic.

For runway status, and therefore for offscale traffic autorange, a distinction is made between ownship's taxi runways, takeoff runway, and landing runway. The logic associated with each is different. The takeoff and landing runway status logic used to infer that ownship is taking off or landing on a particular runway and therefore that the runway being used is a takeoff or landing runway is not used for any other purpose than to infer takeoff or landing runway. Accordingly, none of the takeoff or landing runway status display logic applies to taxi conditions.

The above-described methods and systems for displaying a current position of an aircraft in the context of other important or useful information, are operationally desirable and beneficial. The methods and systems facilitate increased safety and efficiency through improved crew awareness of runway related operational information such as runway status, traffic, restrictions, exit and route information, alerting, and a reduced potential for missed runway exit and traffic conflicts. Accordingly, the methods and systems facilitate situation awareness, navigation, and reduce crew workload.

While the disclosure has been described in terms of various specific embodiments, those skilled in the art will recognize that the disclosure can be practiced with modification within the spirit and scope of the claims.

What is claimed is:

1. A method of indicating a position of a vehicle on a display system comprising:
    determining a current position and a path of travel of the vehicle;
    determining a current position of at least one of a second vehicle, an object, and an area of interest wherein determining a current position of the second vehicle comprises determining a path of travel of the second vehicle;
    displaying a depiction of the vehicle and at least a portion of the at least one of the second vehicle, the object, and the area of interest at a first range setting;
    automatically changing from the first range setting to a second range setting based on at least one of an approach autorange activation, a taxi autorange activation, an offscale traffic autorange activation, and an offscale object or area of interest autorange activation, wherein automatically changing from the first range setting to the second range setting comprises switching from the first range setting to the second range setting in one or more step changes in range setting wherein each step is sufficiently small such that said switching from the first range setting to the second range setting appears continuous to a user; and
    displaying the ownship depiction and at least a portion of the at least one of the second vehicle, the object, and the area of interest at the second range setting.

2. A method in accordance with claim 1 further comprising determining an approach autorange activation wherein the approach autorange activation is based on at least one of a proximity of the vehicle to at least one of the second vehicle, the object, and the area of interest and an intersection of the path of travel of the vehicle with at least one of the position of the object and the area of interest.

3. A method in accordance with claim 1 further comprising determining an offscale traffic autorange activation wherein the offscale traffic autorange activation is based on an intersection of the path of travel of the vehicle and the path of the second vehicle.

4. A method in accordance with claim 1 wherein said determining a path comprises determining at least one of a runway volume and a taxiway volume.

5. A method in accordance with claim 1 wherein said determining a path comprises determining at least one of a next runway volume and a next taxiway volume with respect to the current position of the vehicle.

6. A method in accordance with claim 1 further comprising:
   manually selecting the first range setting; and
   automatically changing from the second range setting to the first range setting when the approach autorange activation, the offscale traffic autorange activation, and the offscale object or area autorange activation terminate.

7. A method of presenting a current position of a vehicle on a moving map display using automatic display ranging, said method comprising:
   determining a current position of the vehicle with respect to at least one of a predetermined object and an area of interest;
   displaying an ownship depiction of the vehicle and at least a portion of the at least one of a predetermined object and an area of interest at a first range setting;
   automatically changing from the first range setting to a second range setting based on a first triggering event wherein the first triggering event includes at least one of a proximity of the vehicle to the predetermined object and a proximity of the vehicle to the area of interest, wherein automatically changing from the first range setting to the second range setting comprises switching from the first range setting to the second range setting in one or more step changes in range setting wherein each step is sufficiently small such that said switching from the first range setting to the second range setting appears continuous to a user; and
   displaying the ownship depiction and at least a portion of the at least one of the predetermined object and the area of interest at the second range setting.

8. A method in accordance with claim 7 wherein displaying the ownship depiction comprises displaying the ownship depiction in at least one of a course-up orientation and a north-up orientation.

9. A method in accordance with claim 7 wherein automatically changing from the first range setting to a second range setting comprises switching from the first range setting to a second range setting in one or more step changes in range setting.

10. A method in accordance with claim 7 further comprising:
    manually selecting the first range setting; and
    automatically changing from a current range setting to the manually selected first range setting when the automatic display ranging is manually or automatically disabled or deactivated.

11. A method in accordance with claim 7 further comprising changing from the second range setting to a third range setting based on a second triggering event.

12. A method in accordance with claim 11 wherein changing from the second range setting to a third range setting comprises switching from the second range setting to the third range setting in one or more step changes in range setting wherein each step is sufficiently small such that said switching from the second range setting to the third range setting appears continuous to a user.

13. A method in accordance with claim 11 further comprising determining a second triggering event wherein determining the second triggering event comprises:
    determining an ownship track of travel for a future period of time;
    determining a track of travel of a second vehicle for the future period of time;
    comparing the ownship track of travel to the second vehicle track of travel;
    generating a second triggering event if the ownship track of travel and the second vehicle track of travel intersect within a predetermined window of time within the future period of time.

14. A method in accordance with claim 13 further comprising generating a second triggering event if the ownship track of travel and the second vehicle track of travel approach within a predetermined distance within the future period of time.

15. A method in accordance with claim 13 wherein said track of travel comprises at least one of a heading, an altitude, and a width.

16. A method in accordance with claim 13 wherein the future period of time comprises a distance.

17. A method in accordance with claim 13 wherein the second vehicle is located beyond the display range of the moving map display, and wherein said third range setting comprises a range setting that includes the ownship depiction and the second vehicle on the moving map display simultaneously.

18. A method in accordance with claim 13 wherein determining an ownship track of travel comprises determining at least one of an ownship runway and an ownship taxiway.

19. A method in accordance with claim 13 wherein determining an ownship track of travel comprises determining at least one of an ownship altitude, an ownship speed, changes in ownship speed, and an ownship heading.

20. A method in accordance with claim 13 wherein determining a track of travel of a second vehicle comprises determining at least one of a second ship runway and a second ship taxiway.

21. A method in accordance with claim 13 wherein determining a second ship track of travel comprises determining at least one of a second ship altitude, a second ship speed, changes in second ship speed, and a second ship heading.

* * * * *